United States Patent
Blouch et al.

(10) Patent No.: US 10,132,707 B2
(45) Date of Patent: Nov. 20, 2018

(54) DEVICES AND METHODS FOR FEEDTHROUGH LEAKAGE CURRENT DETECTION AND DECONTAMINATION IN IONIZATION GAUGES

(71) Applicant: MKS Instruments, Inc., Andover, MA (US)

(72) Inventors: Stephen C. Blouch, Boulder, CO (US); Paul C. Arnold, Boulder, CO (US); Gerardo A. Brucker, Longmont, CO (US); Wesley J. Graba, Mead, CO (US); Douglas C. Hansen, Boulder, CO (US)

(73) Assignee: MKS Instruments, Inc., Andover, MA (US)

( * ) Notice: Subject to any disclaimer, the term of this patent is extended or adjusted under 35 U.S.C. 154(b) by 383 days.

(21) Appl. No.: 14/795,706

(22) Filed: Jul. 9, 2015

(65) Prior Publication Data
US 2017/0010171 A1 Jan. 12, 2017

(51) Int. Cl.
*G01L 21/32* (2006.01)
*H01J 41/04* (2006.01)

(52) U.S. Cl.
CPC .............. *G01L 21/32* (2013.01); *H01J 41/04* (2013.01)

(58) Field of Classification Search
CPC ......... G01L 21/30; G01L 21/32; G01L 21/34; H01J 41/02; H01J 41/06; H01J 41/04; G01N 27/60; G01N 27/62
See application file for complete search history.

(56) References Cited

U.S. PATENT DOCUMENTS

| 2,560,952 A | 7/1951 | Herold |
| 2,774,645 A | 12/1956 | Batchelor |
| 2,783,116 A | 2/1957 | Schaedler et al. |
| 2,897,435 A | 7/1959 | Fistell |

(Continued)

FOREIGN PATENT DOCUMENTS

WO WO 2017/007532 A1 1/2017

OTHER PUBLICATIONS

Notification of Transmittal of the International Search Report and Written Opinion of the International Searching Authority, or the Declaration for PCT/US2016/032079, entitled: Feedthrough Leakage Current Detection and Decontamination in Ionization Gauges, dated Sep. 23, 2016.

(Continued)

*Primary Examiner* — Thang Le
(74) *Attorney, Agent, or Firm* — Hamilton, Brook, Smith & Reynolds, P.C.

(57) ABSTRACT

Devices and corresponding methods can be provided to test an ionization gauge, such as a hot cathode ionization gauge, for leakage currents and to respond to the leakage currents to improve pressure measurement accuracy. Responding to the leakage current can include applying a correction to a pressure measurement signal generated by the gauge based on the leakage current. Responding to the leakage current can also include removing contamination causing the leakage current, where the contamination is on electrical feedthrough insulators or other gauge surfaces. Testing and correcting for leakage currents and removing contamination can be completed with the ionization pressure gauge in situ in its environment of use, and while the gauge remains under vacuum.

24 Claims, 14 Drawing Sheets

(56) References Cited

U.S. PATENT DOCUMENTS

| | | | | |
|---|---|---|---|---|
| 4,636,680 | A * | 1/1987 | Bills | H01J 41/04 |
| | | | | 313/230 |
| 6,054,862 | A * | 4/2000 | Zhou | G01L 21/32 |
| | | | | 324/460 |
| 7,295,015 | B2 | 11/2007 | Arnold et al. | |
| 7,352,187 | B2 * | 4/2008 | Knapp | G01L 21/12 |
| | | | | 324/460 |
| 7,456,634 | B2 | 11/2008 | Knott | |
| 7,456,635 | B2 | 11/2008 | Akkerman et al. | |
| 8,288,715 | B2 * | 10/2012 | Nakajima | G01N 27/66 |
| | | | | 250/282 |
| 2006/0043279 | A1 * | 3/2006 | Kudryavtsev | G01N 27/66 |
| | | | | 250/282 |
| 2008/0100301 | A1 | 5/2008 | Knott | |
| 2009/0134018 | A1 * | 5/2009 | Watanabe | C23C 14/564 |
| | | | | 204/298.03 |
| 2009/0146665 | A1 * | 6/2009 | Knott | H01J 41/04 |
| | | | | 324/460 |
| 2010/0159120 | A1 * | 6/2010 | Dzengeleski | H01J 37/32935 |
| | | | | 427/8 |
| 2011/0315872 | A1 * | 12/2011 | Nakajima | G01M 3/202 |
| | | | | 250/283 |
| 2015/0091579 | A1 | 4/2015 | Brucker et al. | |

OTHER PUBLICATIONS

Notification Concerning Transmittal of International Preliminary Report on Patentability for International Application No. PCT/US2016/032079, titled: "Feedthrough Leakage Current Detection and Decontamination in Ionization Gauges," dated Jan. 18, 2018.

* cited by examiner

DEVICES AND METHODS FOR FEEDTHROUGH LEAKAGE CURRENT DETECTION AND DECONTAMINATION IN IONIZATION GAUGES

BACKGROUND

Ionization vacuum pressure gauges can be used in a wide variety of applications such as semiconductor manufacturing, thin film deposition, high energy physics, ion implantation, and space simulation. Ionization gauges can include both cold cathode ionization gauges (CCIGs) and hot cathode ionization gauges (HCIGs), and some example HCIG designs include Bayard-Alpert (BA), Schulz-Phelps, triode, etc. The sensor of a typical hot cathode ionization vacuum pressure gauge includes a cathode (the electron source, also called the filament), an anode (also called the grid), and an ion collector electrode. For the BA gauge, the cathode is located radially outside of an ionization space (anode volume) defined by the anode. The ion collector electrode is disposed within the anode volume. Electrons travel from the cathode toward and through the anode, and are eventually collected by the anode. However, in their travel, the electrons impact molecules and atoms of gas, constituting the atmosphere whose pressure is to be measured, and create ions. The ions created inside the anode volume are attracted to the ion collector by the electric field inside the anode. The pressure of the gas within the atmosphere can be calculated from ion and electron currents by the formula $P=(1/S)(i_i/i_e)$, where S is a scaling coefficient (gauge sensitivity) with the units of 1/torr and is characteristic of a particular gauge geometry, electrical parameters, and pressure range; and $i_i$ is the ion current and $i_e$ is the electron emission current.

Ionization gauges typically include several electrical feedthroughs with connection pins (each sensor electrode is fabricated with an electrode connection post, which is connected to a feedthrough electrical connection pin or conductor) extending through a header housing to provide power to, and receive signals from, the sensor. Electrical insulators can be provided between the feedthrough pins and header housing and other sensor components to maintain operational safety and signal integrity and prevent electrical currents from leaking from feedthrough pins to the header housing connected to the gauge envelope.

SUMMARY

The effectiveness of electrical feedthrough insulators can be compromised by conductive contamination that can build up on the feedthrough insulators of ionization gauges such as hot cathode ionization gauges (HCIGs) which will now be described in detail. Contaminants can form a low-impedance path between the feedthrough pins (conductors) and the header housing of an HCIG sensor, allowing leakage currents to flow where feedthrough insulators would otherwise prevent leakage. The leakage currents can cause negative effects ranging from inaccurate pressure measurement to complete sensor failure. For example, leakage from cathode electrical feedthroughs can lead to incorrect electron emission current settings and incorrect pressure measurements. Furthermore, it is desirable to maintain lower electron emission currents, e.g., below 20 microamperes (μA) to extend cathode lifetime. However, when leakage currents become sufficiently high, they can restrict the ability to operate an HCIG cathode at lower electron emission currents and still maintain pressure measurement accuracy, and the necessary higher cathode electron emission currents can reduce cathode lifetime. Furthermore, anode feedthrough insulators can also become contaminated, particularly during degassing procedures in which anode structures are heated. In addition to cathode and anode feedthrough insulators, other feedthrough insulators such as ion collector feedthrough insulators can also become contaminated and compromise sensor operation.

There is a need to be able to measure leakage currents and mitigate them with a sensor remaining in its environment of normal use, without having to remove a gauge from a position of normal operation or return it to a manufacturer or other service facility.

In accordance with embodiments of the invention, devices and methods are provided for testing HCIGs for leakage current and for responding to leakage current to improve pressure measurement accuracy and gauge lifetime. Other advantages of embodiments of the invention include the ability to measure leakage current in situ (with HCIGs in their normal operational positions) and while remaining under vacuum. Any necessary gauge service can be decreased or eliminated, electron emission currents can be reduced while maintaining pressure measurement accuracy, and gauge lifetimes can be increased.

A device and corresponding method may include an HCIG in which ions are generated by electron flow between the cathode and anode. The device can also include an electrical circuit coupled to an HCIG and configured to test the HCIG under vacuum in situ for leakage current and to respond to the leakage current to improve pressure measurement accuracy.

The electrical circuit can be further configured to decontaminate the HCIG in situ by electrically heating contamination in the HCIG, and decontamination of the HCIG can also occur with the gauge under vacuum. The contamination can be on an electrical insulator configured to electrically isolate an electrical feedthrough pin in the HCIG, and the electrical circuit can be further configured to electrically heat the contamination by increasing the voltage across the electrical feedthrough insulator to increase current passing through contamination on the insulator. The electrical circuit can also be configured to respond to the test of leakage current by applying a correction to a pressure measurement signal generated by the device based on the leakage current or by applying a correction in an electron emission current control feedback loop. The electrical circuit can include a current sensor configured to measure a calibration current that reflects leakage current and to measure electron emission current and a processor to compute pressure based on the calibration current and the measured electron emission current. The electrical circuit can be configured to test for the leakage current by increasing voltage applied across an electrical feedthrough insulator and by measuring current through the contamination on the insulator.

The tested leakage current can be from at least a cathode feedthrough pin or at least from an anode feedthrough pin. The device can also include an indicator configured to provide, based on the level of the tested leakage current, an indication that the HCIG requires service or replacement. The measured vacuum pressure can have an accuracy within a range of about ±15% even under the most demanding conditions, such as when the HCIG is operated with an electron emission current in a range of about 5 to 10 μA.

A method and corresponding device can include measuring vacuum pressure in an HCIG by measuring ions generated with electron flow between a cathode and an anode, testing the HCIG under vacuum in situ for leakage current, and responding to the leakage current to improve pressure measurement accuracy.

A method can include measuring vacuum pressure in an HCIG by measuring ions generated with electron flow between a cathode and an anode and removing contamination from an electrical feedthrough insulator in the HCIG in situ by electrically heating the contamination. Removing the contamination from the electrical feedthrough insulator can be performed while the HCIG remains under vacuum. Removing the contamination can be completed by increasing voltage across an electrical feedthrough insulator to increase any current passing through the contamination on the insulator.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Hot cathode ionization vacuum pressure gauges (HCIGs) are used in a wide variety of applications such as semiconductor manufacturing, thin film deposition, high energy physics, ion implantation, and space simulation. Many of these applications require high gauge reliability, low failure rates, and good pressure measurement accuracy over many orders of magnitude of pressure. With these considerations in mind, increasing gauge lifetime and service intervals and preventing any degradation in performance is very important.

Figure 1A:
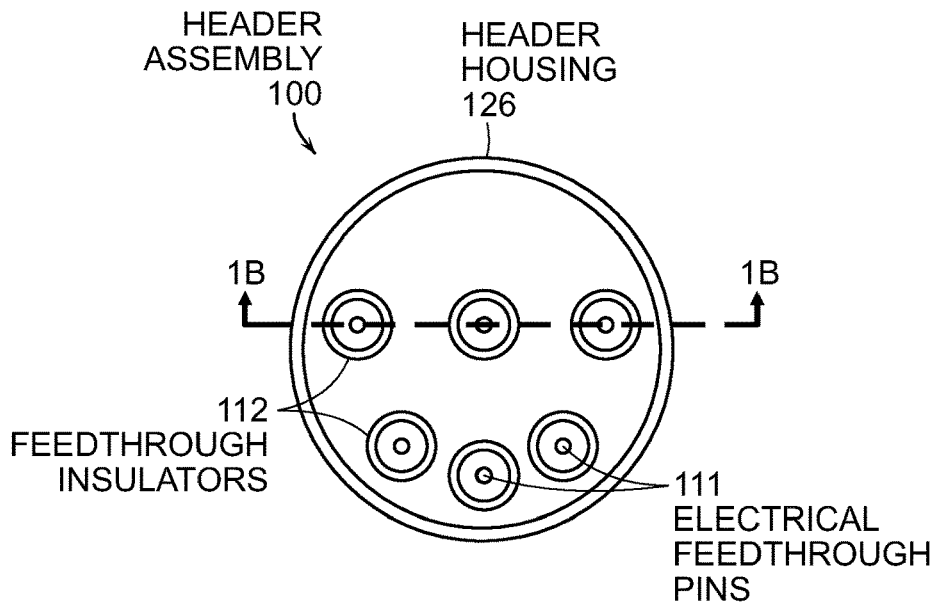
FIG. 1A is a top view of an example gauge header showing several electrical feedthroughs.
Figure 1B:
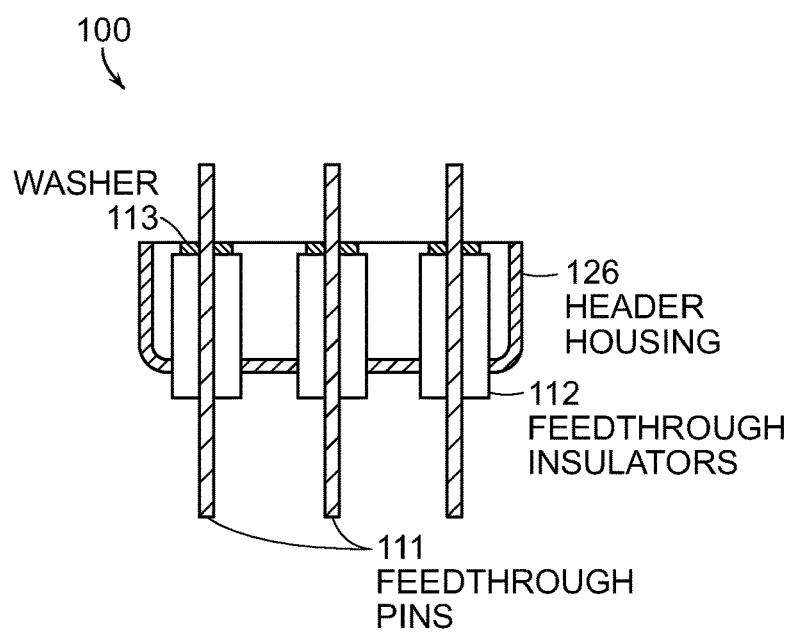
FIG. 1B is a cross-sectional side view of the gauge header illustrated in FIG. 1A.
Figure 1C:
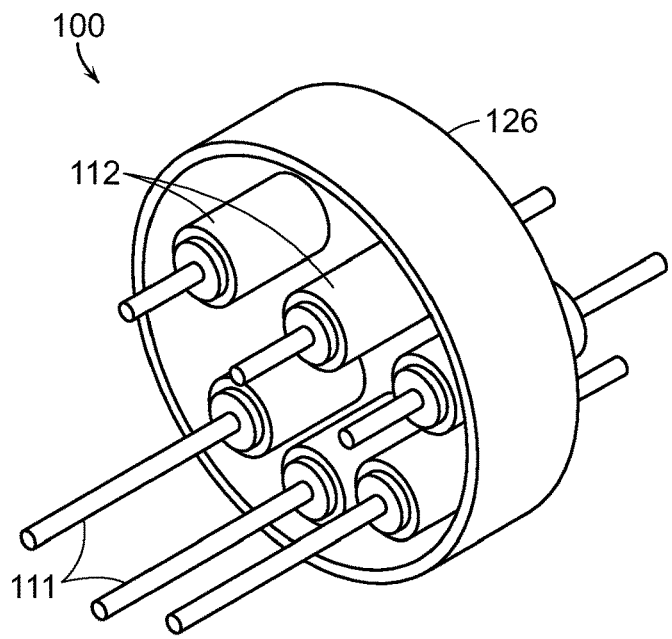
FIG. 1C is a perspective view illustration of the gauge header illustrated in FIG. 2A.

FIGS. 1A-1C illustrate a typical gauge header assembly 100, which includes several electrical feedthrough pins 111 (conductors) protruding through a header housing 126. In particular, FIG. 1A is an end view of the header assembly 100, FIG. 1B is a cross-sectional side view at the location A-A indicated in FIG. 1A, and FIG. 1C is a perspective view of the same header 100. The electrical feedthroughs provide power and signal paths through the gauge header, by means of the feedthrough pins they contain. The feedthrough pins 111 are electrically insulated from the header housing 126 and other portions of the gauge envelope (not shown) by feedthrough insulators 112. Washers 113 are also used in the design of FIGS. 1A-1C, and the washers 113 are sealed to respective feedthrough pins 111 and insulators 112 to provide vacuum barriers.

Figure 1D:
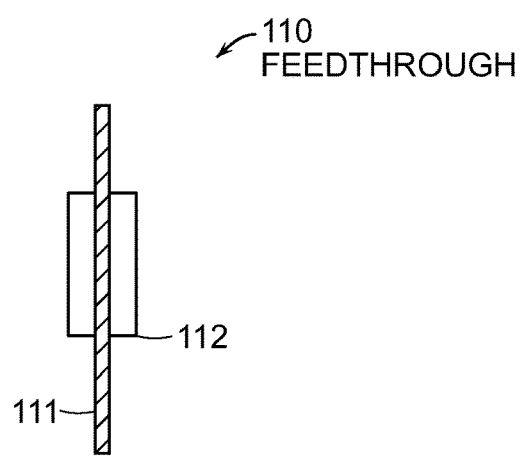
FIG. 1D is a cross-sectional side view of a single one of the feedthroughs illustrated in FIGS. 1A-1C.

FIG. 1D is a cross-sectional side view of a single one of the feedthroughs illustrated in FIGS. 1A-1C. As illustrated in FIG. 1D, a feedthrough 110 includes the feedthrough pin 111 and the insulator 112.

Over time, conductive coatings can form on feedthrough insulators such as the insulators 112 in FIGS. 1A-1D, which can result in low-impedance paths. For example, the coatings can reduce the equivalent resistance from feedthrough pins to the header housing of the gauge from teraohms (TΩ) to megohms (MΩ) or much less, and the reduced impedance allows leakage currents to develop between internal electrodes and the header housing or other paths to ground. Thermal decomposition of thermally labile compounds is one example source of contamination, in addition to coatings deposited as conductive coatings, and coatings of such contamination can form on any warm or hot feedthrough. Thermally labile compounds can become conductive when heated. The contamination on cathode electrical feedthrough insulators can become conductive by this mechanism because they typically run hotter than the rest of the electrical feedthroughs. Cathode feedthroughs are usually hotter because they are thermally connected to the incandescent cathode.

As contamination increases, leakage currents can build up and can ultimately cause a gauge to fail (e.g., by cathode degradation). Leakage currents can also cause inaccuracies if ignored. Leakage currents limit the minimum practical electron emission currents that can be used in HCIGs, limiting the upper pressure at which HCIGs can be operated. Leakage currents can also limit the lower pressure at which HCIGs can be operated due to the need to measure very low ion currents at these pressures. The effect of feedthrough insulator contamination and leakage currents is further illustrated in FIG. 2A.

Figure 2A:
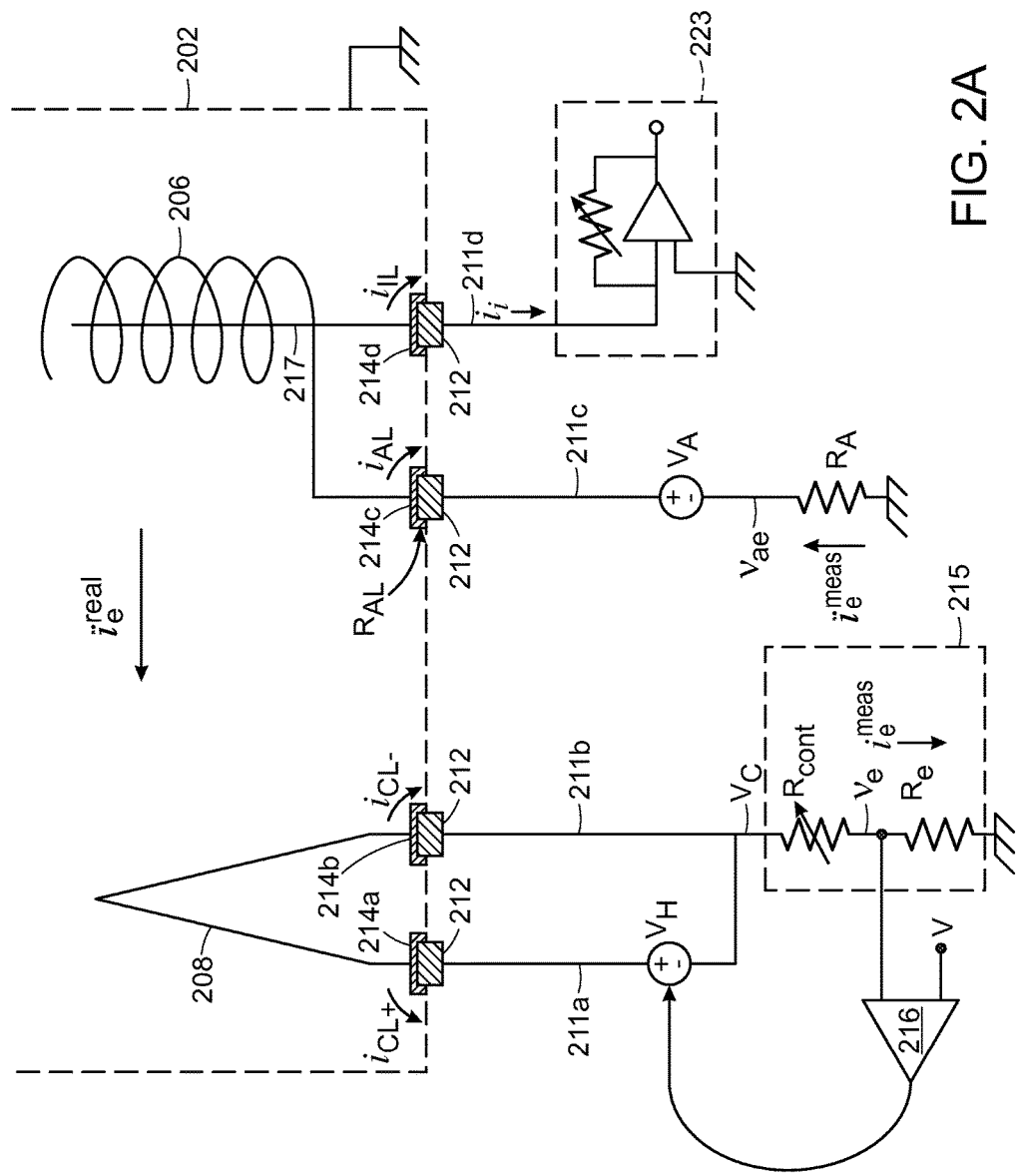
FIG. 2A is a schematic illustration of current control loops in an example hot cathode ionization gauge (HCIG).

FIG. 2A is a more detailed schematic diagram of an example HCIG gauge 202 having a cathode 208 and an anode 206 with feedthrough insulators having contamination and leakage currents. The general principles of operation of the gauge 202 are explained in the BACKGROUND section hereinabove and are similar to those described in U.S. Pat. No. 7,295,015, which is incorporated herein by reference in its entirety. The device of FIG. 2A includes three power supplies, namely a cathode heater power supply $V_H$, a cathode bias power supply 215 (modelled as a measured electron emission current $i_e^{meas}$ flowing through a fixed resistor $R_e$ and a variable control resistor $R_{cont}$), and an anode bias power supply $V_A$. In addition, a cathode electron emission current control amplifier 216 provides cathode heating power to the cathode 208. The cathode bias power supply 215 and control amplifier 216 work together to maintain a cathode bias voltage $V_C$ as close to a fixed value (e.g., +30.0V) as possible. The heating voltage $V_H$ of the cathode is controlled using the control amplifier 216. Electrical feedthroughs extending through the header housing 202 include positive and negative cathode feedthroughs 211a and 211b, respectively, an anode feedthrough 211c, and an ion collector feedthrough 211d, which is electrically connected to an ion collector 217.

The ion collector 217 is connected to an electrometer (transimpedance current picoammeter) 223 that measures the ion collector current $i_i$ and is generally operated at virtual ground. The current $i_i$ can also be referred to as a pressure measurement signal. The ion collector current $i_i$ is directly related to the reported pressure in the device of FIG. 2A. The ion collector current $i_i$ is also referred to herein as a pressure measurement signal. Feedthrough insulators 212 are designed to electrically insulate the electrical feedthrough pins 211a-d from header housing surfaces and other electrical paths. During operation of the HCIG illustrated in FIG. 2A, an actual electron emission current $i_e^{real}$ is established between the anode 206 and the cathode 208, and the electron emission current is sunk to ground through the cathode bias power supply 215. In order to close the loop on the electron emission current $i_e$, the voltage $v_e$ can be measured above resistor $R_e$ and used as a measurement of the electron emission current. In the absence of contamination on the feedthroughs, $v_e = R_e * i_e^{real} = R_e * i_e^{meas}$, and the voltage $v_e$ can be used to accurately close a loop on electron emission current.

FIG. 2A is also used herein to describe, in further detail, problems that arise if the electrical feedthrough insulators 212 become contaminated with conductive contamination 214a-d, giving rise to leakage currents $i_{CL+}$, $i_{CL-}$, $i_{AL}$, and $i_{IL}$, respectively. The quantity $i_{CL+}$ is the leakage current at the positive cathode feedthrough insulator, while $i_{CL-}$ is the leakage current at the negative cathode feedthrough insulator. Similarly, $i_{AL}$ is the leakage current at the anode feedthrough, and $i_{IL}$ is the leakage current at the ion collector feedthrough. The cathode leakage currents flow across $R_e$ in a direction opposite to that of $i_e$, making $v_e = R_e(i_e^{real} + i_{CL})$, where $i_{CL} = i_{CL+} + i_{CL-}$. Therefore, $v_e$ no longer can be used to accurately close the loop on the electron emission current requested unless the $i_{CL}$ is independently measured and accounted for. Because the two currents $i_e$ and $i_{CL-}$ have opposite signs, an increase in leakage current $i_{CL-}$ makes the cathode heating supply 218 work harder to close the electron emission current loop. The error in electron emission current can be quite large since conductive coatings on cathode feedthrough insulators can have resistances below 1 MΩ, for example. Such high conductivities can restrict the ability to operate the gauge at electron emission currents below 20 μA, for example. Thus, if $i_{CL-}$ is not known or simply ignored, then assuming $v_e = R_e * i_e^{meas}$ to close the electron emission current loop will lead to the wrong electron emission current setting, errors in pressure measurement, and reduced cathode lifetime. It should be noted that $i_e^{meas}$ is the measured electron emission current.

As already described above, cathode feedthrough insulators can become conductively contaminated even if some coatings are not initially conductive. However, it is also possible for leakage currents to develop across other electrical feedthrough insulators, as well as other surfaces. For example, it is possible to build coatings on all hot surfaces connected thermally to the hot cathode. In many cases, the material can also build up on those insulators and provide a connection to ground that also causes leakage currents to ground. For example, it has been observed that, in the presence of thermally labile compounds such as arsine, enough byproduct material (i.e. arsenic from arsine) can build up on the adjacent envelope surfaces to eventually provide a short to the cathode posts.

Anode feedthrough insulator leakage current can likewise be problematic. For example, in some HCIG systems, the electron emission current $i_e$ is measured at the anode. This is sometimes considered to be a more accurate measurement of $i_e$ because it represents the flow of electrons into the anode, where ionization ultimately occurs. Since the anode is also connected to a bias supply, there is a chance of developing leakage current $i_{AL}$ across that electrical feedthough insulator as well. This can cause the same problems described above in relation to cathode feedthroughs if, for the anode, $v_{ae}$ (indicated in FIG. 2A) is used to close the $i_e$ electron emission current loop. Considerations similar to those already given for the cathode leakage above lead to $v_{ae} = -i_e^{meas} * R_A = -(i_e^{real} + i_{AL}) R_A$ in the presence of anode feedthrough leakage, where $R_A$ is a resistor to measure electron emission current from the anode side. Thus, while $i_{AL}$ has the same sign as $i_e$, failure to account for $i_{AL}$ in the electron emission current measurement is as problematic as in the case of cathode leakage current.

Contamination of electrical feedthrough insulators at an ion collector pin of an HCIG can also be problematic. One difference in this case is the lack of a bias power supply that can provide a leakage current. The ion collector pin is generally operated connected to the virtual ground of the electrometer, so the issue that can arise is the resistance of the contamination layer on the electrical feedthrough insulator reaching values lower than the transimpedance of the electrometer. If the feedthrough insulator becomes leaky, the ion collector current can drain either into ground through the coating or into virtual ground through the electrometer's impedance.

As illustrated by the above considerations, unless $i_{CL}$ is well-known in an HCIG, it is possible to compromise cathode lifetime and/or provide inaccurate pressure readings. Furthermore, knowing $i_{CL}$ is very important if low electron emission currents need to be selected for operation.

Previous approaches to solving the problem of leakage currents such as those illustrated in FIG. 2A have included modifying sensors by shading electrodes and implementing both multiple and single feedthrough shields, which prevent line of sight paths from contamination sources to feedthrough insulators. These feedthrough shields are described in U.S. Pat. No. 7,456,635, filed Oct. 26, 2006, the entirety of which is incorporated by reference herein. However, while these techniques can potentially minimize the rate of contamination buildup, they do not prevent or remedy contamination buildup from gaseous products not constrained to line of sight paths and the consequent leakage currents. Thus, to achieve high reliability and accuracy of HCIGs, contamination of electrical feedthrough insulators should be addressed, and there is a need for a solution to address contamination by determining and compensating for leakage currents or eliminating the contamination.

In accordance with embodiments of the current invention, the problems associated with conductive contamination and leakage currents in HCIGs can be overcome. Leakage currents can be measured and then responded to by correcting for leakage current, removing contamination causing the leakage, and/or indicating to a user that service is required. Moreover, devices and processes can be provided for testing HCIGs for leakage currents in situ and under vacuum, without sending a vacuum gauge into a factory or otherwise removing the vacuum gauge from its operational environment for service. Thus, pressure measurement accuracy can be improved, and gauge lifetime and service intervals can be extended.

In various embodiments, once a high leakage current is detected, the user can be provided with the diagnostic warning that the leakage current has exceeded a specified threshold value. If the threshold is crossed, the user can be advised to perform the feedthrough insulator decontamination procedure, or a decontamination procedure can be initiated automatically in some embodiments. In order to perform a feedthrough insulator decontamination, a feedthrough pin can be momentarily connected to a high-voltage supply, for example, that runs sufficient current across the contamination film to evaporate the contamination through resistive heating. Once the decontamination is completed, the unit can re-test the leakage current to determine whether the diagnostic warning can be removed from a queue or whether further cleaning is still required. While such a decontamination cleaning could be performed with the HCIG in a service environment, outside of its normal operational use, it is a significant advantage of embodiments of the current invention that decontamination can be performed with the HCIG in situ, in its normal operational environment, with the HCIG remaining under vacuum.

Figure 2B:
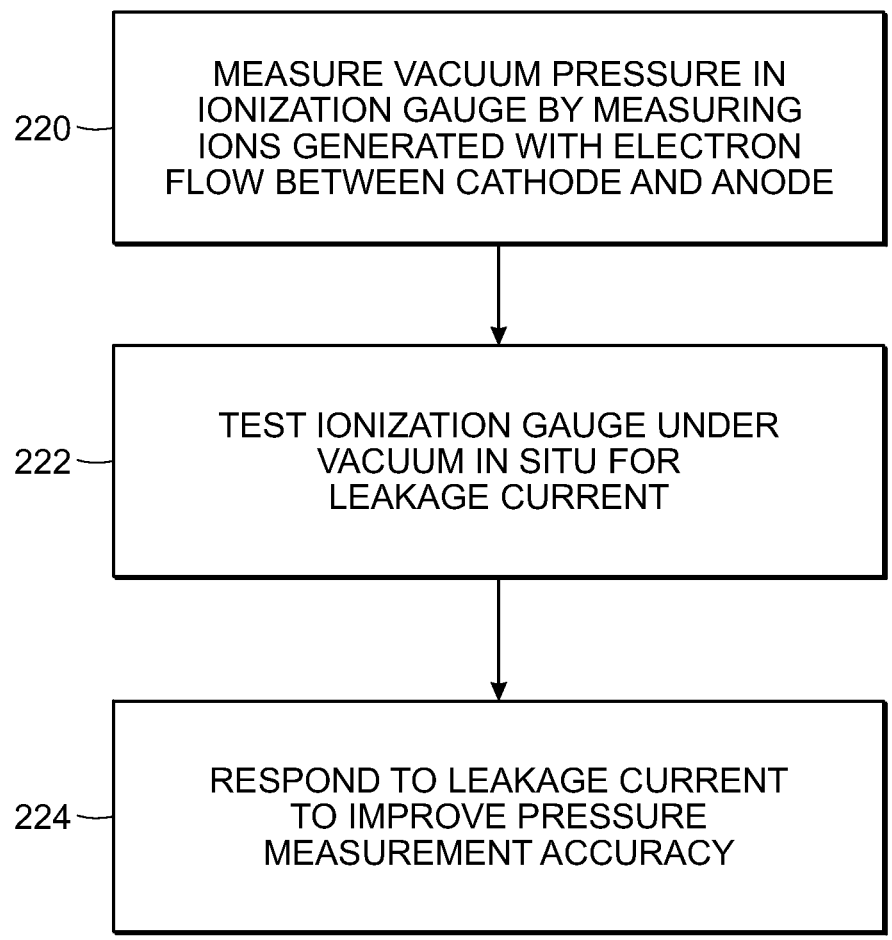
FIG. 2B is a flow diagram illustrating a method according to an embodiment of the invention to test an HCIG, such as the gauge illustrated in FIG. 2A, for leakage current and to respond to a leakage current to improve pressure measurement accuracy.

FIG. 2B illustrates an example method according to an embodiment of the present invention. Such a method can be applied to a device similar to the device shown illustrated in FIG. 2A, with appropriate device modifications and measurements described hereinafter. In FIG. 2B, at 220, the vacuum pressure in an HCIG is measured by measuring ions generated with electron flow between a cathode and anode of the gauge, such as the cathode 208 and anode 206, respectively, illustrated in FIG. 2A. At 222, the HCIG is tested under vacuum in situ for leakage current. At 224, the leakage current is responded to in order to improve pressure measurement accuracy. In some example embodiments, the response includes compensation for inaccuracies in pressure values, the compensation being based on additional measurements. In other example embodiments, the response includes correction of leakage currents to improve pressure measurement accuracy.

Figure 2C:
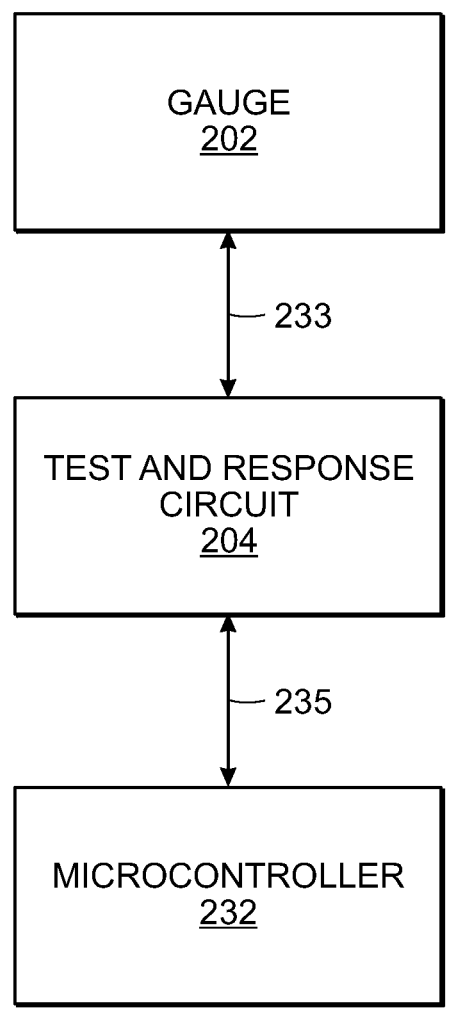
FIG. 2C is a block diagram illustrating an HCIG and an electrical circuit and microcontroller coupled to the gauge and configured to test for and respond to leakage current.

FIG. 2C is a block diagram illustrating an example device according to an embodiment of the invention. The basic device of FIG. 2C includes an HCIG 202 under vacuum, and the HCIG 202 includes an anode 206 and the cathode 208 (as shown in FIG. 2A). An electron emission current $i_e^{real}$ between the anode and cathode generates ions (not shown). The device also includes an electrical circuit 204 configured to test the ionization gauge under vacuum in situ for leakage current and to respond to the leakage current to improve pressure measurement accuracy. A two-sided arrow 233 indicates that the circuit 204 is in electrical communication with the gauge 202. In some embodiments, the test and response circuit 204 is built into the gauge 202. However, in other embodiments, the circuit 204 is physically separate from, but still electrically connected to, the gauge 202. The embodiment of FIG. 2C also includes a microcontroller 232 configured to sample measurable values in the circuit 204 and also to control output control signals as part of a corresponding test and response process. A two-sided arrow 235 represents the microcontroller both receiving sample values from the circuit 204 and sending control signals to the circuit 204. Use of a microcontroller is convenient to provide automation of a test and response process. However, in other embodiments, measurable values can be measured manually using a voltmeter, for example, and control signals can be controlled manually using variable voltage power supplies, for example.

Many different variations of the method illustrated in FIG. 2B and the device illustrated in FIG. 2C are within the scope of the invention. Some of these devices and methods are described hereinafter in connection with FIGS. 3A-3D, 4, and 5-8. In one embodiment, transducer electronics can include additional circuitry to accurately isolate and measure $i_{CL}$ using the measured value to correct the electron emission current control feedback loop. The correction to the feedback loop accounts for the effect of leakage current. Preferably, the user gets accurate pressure readings resulting from the measured leakage current and feedback loop correction, as well as improved cathode lifetime.

In another example embodiment, electronics can be programmed in firmware to measure the leakage current with low accuracy and then rely on a threshold value to decide if the leakage current has exceeded an acceptable value beyond which the ionization gauge will provide accurate pressure readings. The threshold value can be used to determine when the cathode lifetime will be compromised and electrical feedthrough insulator decontamination is required. Once the threshold is crossed, a diagnostic trouble code can be issued to warn the user about the inaccuracy in pressure readings and the potential for a compromised gauge lifetime.

In yet other embodiments, the transducer electronics can independently measure $i_{CL}$. Once $i_{CL}$ is known, the electrical leakage current value can be used to correct the feedback loop on the electron emission current (i.e., by adjusting the calculation of a voltage such as $v_e$ in FIG. 2A) or by using the electrical leakage current to calculate the actual electron emission current $i_e^{real}$ in the gauge and to provide accurate pressure readings based on $i_e^{real}$ flowing in the gauge. A comparator can also be established to decide the right time to decontaminate the electrical feedthrough insulators.

Even where it is not practical to determine whether leakage current to ground is taking place at a particular location such as an electrical feedthrough or somewhere else, it is most important to be able to measure the electrical leakage current and perform the necessary corrections to the electron emission current loop. For example, measuring $i_e$ both at the cathode and the anode is one indirect way of detecting electrical leakage currents. If the pressure in the HCIG is low enough to minimize ionization outside the anode, it can be expected that the values of $i_e$ measured at the anode and the cathode will be the same. If the two readings start to deviate from each other, this can indicate that the electrical feedthrough insulators are developing coatings that need to be addressed. In some embodiments, the difference between the two measurements can be used as a measure of leakage current, especially if one of the sets of electrical feedthrough insulators is more commonly contaminated or coated than the other set.

Figure 3A:
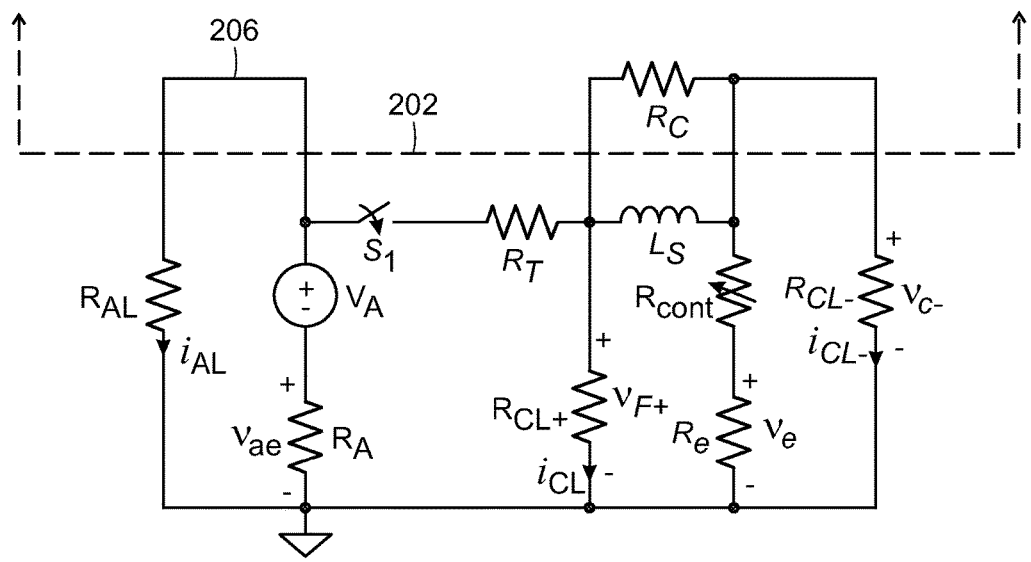
FIG. 3A is a schematic diagram illustrating the electrical equivalent of a HCIG system with cathode power supply off.
Figure 3B:
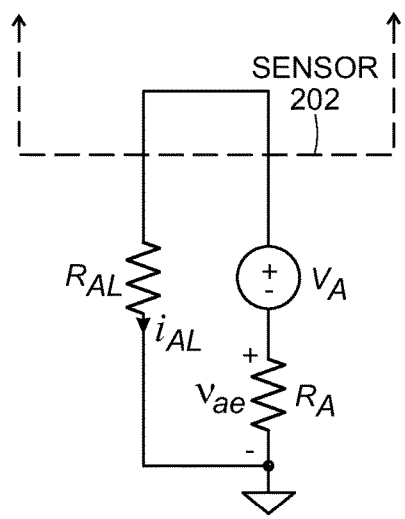
FIG. 3B is a schematic diagram illustrating a portion of the schematic diagram of FIG. 3A equivalent to when the switch $S_I$ is left open to measure the anode feedthrough insulator contamination resistance.
Figure 3C:
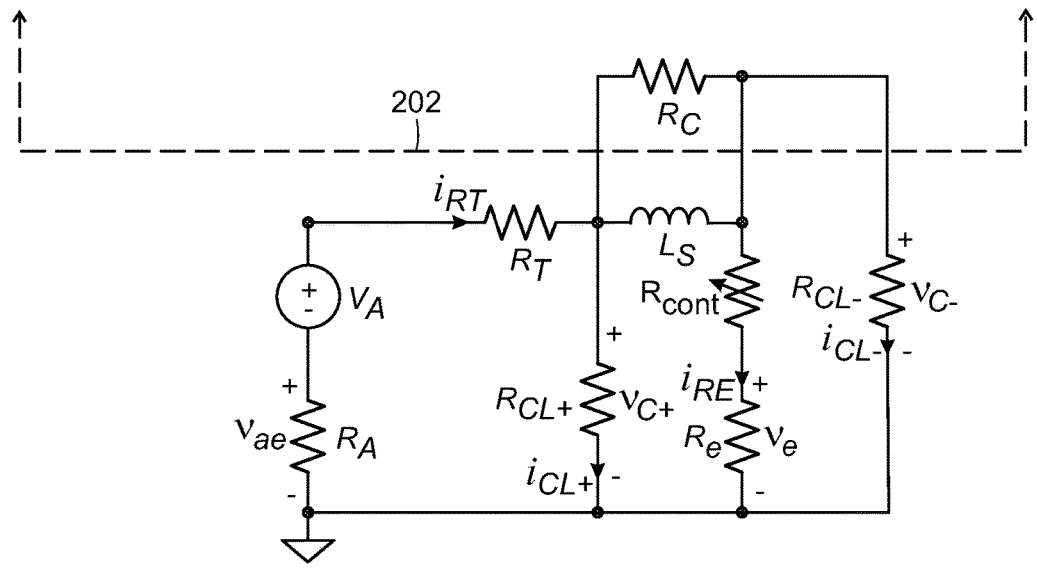
FIG. 3C is a schematic diagram equivalent to the diagram of FIG. 3A when switch $S_I$ is closed and anode feedthrough insulator contamination is ignored.
Figure 3D:
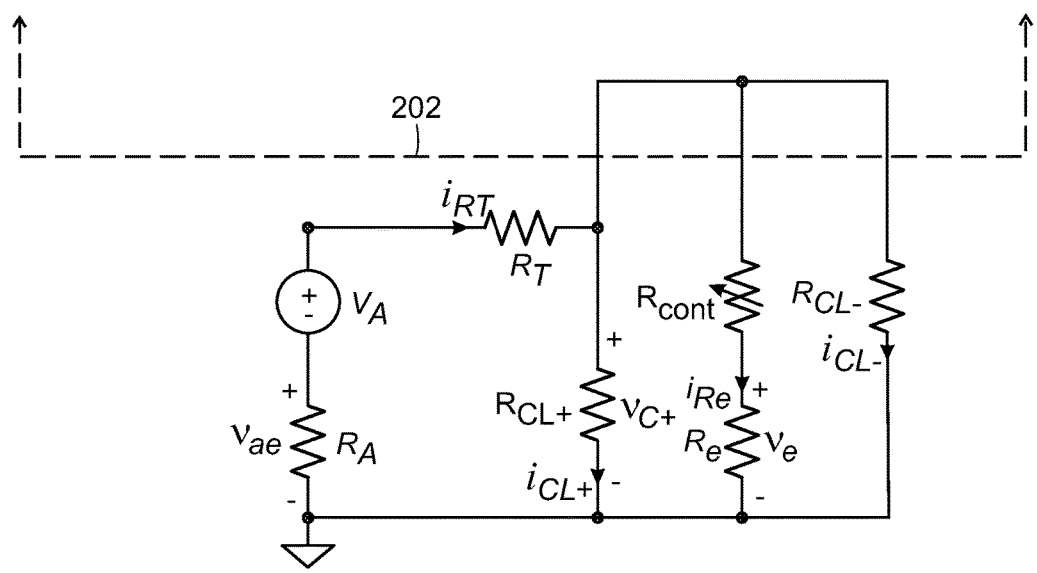
FIG. 3D is a schematic diagram equivalent to a diagram of FIG. 3A when assuming that the steady state, combined resistance of $R_C$ and $L_S$ (illustrated in FIG. 3C) is negligible.

Exemplary embodiments that enable leakage current to be measured and responded to in order to improve pressure measurement accuracy will now be described in greater detail. As part of this description hereinafter, a set of numbered Equations (1)-(11b) are presented and related to FIGS. 3A-3D. FIGS. 3A-3D provide greater details as to how specific devices can be configured for detection and mitigation of leakage currents. In particular, FIGS. 3A and 3B illustrate these principles as to anode feedthrough insulator contamination, and FIGS. 3C to 3D illustrate similar principles as to cathode feedthrough insulator contamination.

As described above, accuracy of the gauge is deteriorated when the contamination on the anode and cathode feedthrough insulators affects the electron emission current measurement and control. Electron emission current ($i_e$) is a critical element of the pressure function of HCIGs, as shown in Equation (1). The accuracy of $i_e$ directly affects the accuracy of the pressure (P).

$$P = \frac{i_i}{i_e S}, \tag{1}$$

where P is the calculated pressure, $i_i$ is the ion collector current measured with the transimpedance amplifier 223 (shown in FIG. 2A), $i_e$ is the electron emission current, and S is a sensitivity scaling coefficient of the gauge. The life of the gauge is reduced in the presence of leakage currents because significantly more cathode power is required to establish the uncompensated electron emission current (when measuring electron emission current at the cathode).

FIG. 3A is a schematic diagram that represents the electrical equivalent of a HCIG system when the power supply that heats the cathode is off and the circuit is at DC (steady state). The electrical circuit of FIG. 3A is an embodiment of the test and response circuit 204 illustrated in FIG. 2C.

There are several differences between FIG. 3A and the gauge electrical circuit illustrated FIG. 2A. In FIG. 3A, the anode is shown on the left, while the cathode is shown on the right, opposite the orientation of FIG. 2A. Further, in FIG. 3A, for simplicity, the ion collector and transimpedance amplifier are not shown. It should be noted, however, that it is described hereinafter how ion collector feedthrough insulators can be decontaminated, just as cathode and anode feedthrough insulators can be. In FIG. 3A, the cathode 208 is represented in simplified form by a resistance $R_C$, and the anode 206 is represented by only a conductor loop. It should also be noted that in FIG. 3A, the cathode heater is represented by an inductor $L_S$. The inductor representation of the cathode heater is helpful when the cathode power supply is off and the secondary side of the transformer used in common power supply designs is simplified to an inductor ($L_S$) with a small steady state resistance. FIG. 3A also includes circuitry that enables measurement of contaminant resistance and decontamination, as described hereinafter. Namely, a switch $S_I$ and test resistance $R_T$ allow the anode and cathode to be electrically connected as further described hereinafter.

The electrical circuit of FIG. 3A interfaces with a sensor (of an HCIG 202), of which only a portion of a housing is shown. The anode power supply is represented by a voltage source $V_A$. Equations (2a) and (2b) give the relationships for measurement of electron emission current using the anode (Equation (2a)) and the cathode, respectively.

$$i_e^{meas} = \frac{v_{ae}}{R_A} \tag{2a}$$

$$i_e^{meas} = \frac{v_e}{R_e} \tag{2b}$$

The heating voltage $V_H$ of the cathode is controlled by the electron emission current that flows through the series resistance of $R_{cont}+R_e$.

The resistances of the contaminants across the anode and cathode feedthrough insulators are represented, respectively, by $R_{AL}$ (anode pin-to-header housing), $R_{CL+}$ ("positive" cathode pin-to-header housing), and $R_{CL-}$ ("negative" cathode pin-to-header housing). Technically, the impedances of the feedthrough insulators are in parallel with the resistances of the contaminants. However, the very high resistances of the uncontaminated feedthrough insulators are not shown in FIG. 3A, only the resistance of the contamination on the insulators, as the impedance of the feedthrough insulators (typically TΩ) are assumed to be much greater than the resistance of the contaminants. This is an acceptable assumption for a contaminated condition, such as in FIG. 3A, because the leakage currents, as shown in FIG. 3A, become important only when the resistance of the contaminants dominates.

FIG. 3B shows the equivalent of the circuit in FIG. 3A when switch $S_I$ is left open to measure the anode feedthrough insulator contamination resistance.

Equation (3c) shows the calculation of the contamination resistance assuming $V_A$ is on, $v_{ae}$, the voltage across $R_A$, and $V_A$ are measured, and $R_A$ is known.

$$i_{AL} = \frac{v_{ae}}{R_A} \tag{3a}$$

$$R_{AL} = \frac{v_{ae} + V_A}{i_{AL}} \tag{3b}$$

$$R_{AL} = R_A\left(1 + \frac{V_A}{v_{ae}}\right) \tag{3c}$$

Once $R_{AL}$ is known, the anode leakage current ($i_{AL}$) can be calculated for various anode bias voltages during operation of a HCIG sensor, as shown in Equation (4).

$$i_{AL}(V_A, v_{ae}) = \frac{v_{ae} + V_A}{R_{AL}} \tag{4}$$

To compensate for the effects of the contamination leakage, the real electron emission current can be calculated and controlled to using Equation (5b).

$$i_e^{real} = i_e^{meas} - i_{AL}(V_A, v_{ae}) \tag{5a}$$

-continued $$i_e^{real} = \frac{v_{ae}}{R_A} - i_{AL}(V_A, v_{ae}) \quad (5b)$$

Thus, Equation (4) for $i_{AL}$, containing $v_{ae}$ and $V_A$, is a signal that is generated by a gauge device, and a test circuit such as that illustrated in FIG. 2C can be used to correct $V_H$ to control to the real electron emission current based on the leakage current $i_{AL}$, which results in a corrected ion collector current $i_i$, which is then used for the corrected pressure measurement signal.

The contamination and leakage current can be eliminated if $V_A$ delivers enough energy over time to raise the temperature of the contaminant to the point of evaporation or volatilization. The total energy E delivered in a time period t is given by Equation (6).

$$E(t) = \int_0^t i_{AL}^2(\tau) R_{AL} d\tau \quad (6)$$

As hereinafter described in conjunction with FIGS. 3C-3D, leakage current due to cathode feedthrough insulator contamination can be measured and taken into account in ways similar to those described above for anode feedthrough insulator leakage currents.

FIG. 3C illustrates the electrical equivalent of the circuit shown in FIG. 3A when the switch $S_f$ is closed and when the anode feedthrough insulator contamination is ignored in order to measure various values to determine cathode feedthrough insulator leakage currents. Assuming $V_A$ is on, one can derive the leakages in the form of measurable and known values, as shown in Equations (7a)-(7c). The quantities $v_{ae}$, $V_A$, $v_{C+}$, and $v_e$ are measurable, while $R_T$ and $R_e$ are known.

$$i_{RT} = i_{CL+} + (i_{CL-} + i_{RE}) \quad (7a)$$

$$\left(\frac{v_{ae} + V_A - v_{c+}}{R_T}\right) = (i_{CL+} + i_{CL-}) + \left(\frac{v_e}{R_e}\right) \quad (7b)$$

$$i_{CL+} + i_{CL-} = \left(\frac{v_{ae} + V_C - v_{C+}}{R_T}\right) - \left(\frac{v_e}{R_e}\right) \quad (7c)$$

The quantity $i_{CL+} + i_{CL-}$ is the leakage current due to the contamination across the cathode feedthrough insulators at a particular $v_{c+}$ and $v_{c-}$ pair. In this case, it is not necessary to know the individual feedthrough pin-to-header housing leakage currents since it is the aggregate that contributes to electron emission current error and possible failure, as shown in Equations (8a)-(8b).

$$i_e^{real} = i_e^{meas} + (i_{CL+} + i_{CL-}) \quad (8a)$$

$$i_e^{real} = \frac{v_e}{R_e} + (i_{CL+} + i_{CL-}) \quad (8b)$$

The relative difference between $v_{C+}$ and $v_{C-}$ may be different during the actual operation of the HCIG sensor. However, this is negligible if the relative error is small compared to the absolute values of $v_{C+}$ and $v_{C-}$. This assumption of small relative error is usually true, but it depends on the properties of the cathode and the desired cathode bias.

However, there will be significant error if the absolute values of $v_{C+}$ and $v_{C-}$ are significantly different in actual operation (this mostly depends on the choice of $V_A$ during measurement). Assuming the equivalent DC (steady state) resistance of $R_C$ and $L_S$ is much less than the equivalent resistance of $R_c$, $R_e$, and $R_{CL-}$, a general equation can be developed for "arbitrary" pairs of $v_{C+}$ and $v_{C-}$ (actually, $v_{C+}$ and $v_{C-}$ are assumed to be the same in this case). The equivalent circuit under these conditions is shown in FIG. 3D, and these conditions allow for a compensation for leakage current to be determined.

FIG. 3D is a schematic diagram illustrating the electrical equivalent of the circuit illustrated in FIG. 3C under the assumption that the steady state resistances of $R_C$ and $L_S$ are negligible. Under the conditions illustrated in FIG. 3D, the individual contaminant resistances are in parallel. The equivalent, combined contaminant resistance ($R_{CL}$) is given by Equations (9a)-(9b).

$$R_{CL} = \frac{v_{C+}}{i_{RT} - i_{Re}} \quad (9a)$$

$$R_{CL} = \frac{v_{C+}}{\frac{v_{ae} + V_A}{R_T} - \frac{v_e}{R_e}} \quad (9b)$$

Knowing $R_{CL}$, the total leakage current $i_{CL}$ can be estimated in terms of $V_{C+}$, as shown in Equations (10a)-(10b).

$$i_{CL+} + i_{CL-} = \frac{v_{C+}}{R_{CL}} \quad (10a)$$

$$i_{CL}(v_{C+}) = \frac{v_{C+}}{R_{CL}} \quad (10b)$$

The same concept previously described herein to compensate the anode feedthrough leakage can also be used here. Once the quantity $i_{CL+} + i_{CL-}$ is known, the electron emission current measurement and electron emission current control are modified as shown in Equation (8a).

Removal of the contaminants is also similar to the removal previously described herein for the anode. The anode power supply $V_A$ is used to provide enough energy E(t) over time through resistive heating to evaporate or volatilize the contaminants. The energy delivered in a time t is given by Equations (11a)-(11b).

$$E(t) = \int_0^t i_{CL+}^2(\tau) R_{CL+} d\tau \quad (11a)$$

$$E(t) = \int_0^t i_{CL-}^2(\tau) R_{CL+} d\tau \quad (11b)$$

As described above in conjunction with FIGS. 3A-3D and the accompanying equations, various voltages can be measured and various electrical elements can be controlled to both detect and eliminate the feedthrough insulator contamination. This electrical control can be implemented, for example, using hardware that supports firmware that is used on a central processor.

The requirements on the hardware and firmware can be reduced if the contaminant removal is not performed (i.e., only leakage detection and compensation are performed). However, compensation methods need to be sufficient for the requirements of particular users, and the above-described circuits permit both compensation for leakage currents and removal of contamination if necessary.

It is important to know when to execute the contamination mitigation. This is largely dependent on the requirements and processes of the ionization sensor user. In most cases, the contamination will affect the accuracy and lifetime of the transducer. Contamination can also affect thermally sensitive processes (like outgassing) due to the increased temperature of the cathode needed to establish the desired electron emission current. Some acceptable times to run contamination mitigation, depending on particular user requirements, can include:

When power is applied to the gauge or the gauge is reset

As part of a test-suite, such as Power-On-Self-Test (POST)

Whenever any of the critically operating parameters change: cathode bias, anode bias, electron emission current, etc.

After a degassing cycle (when a maintenance operation is already being performed)

Figure 4:
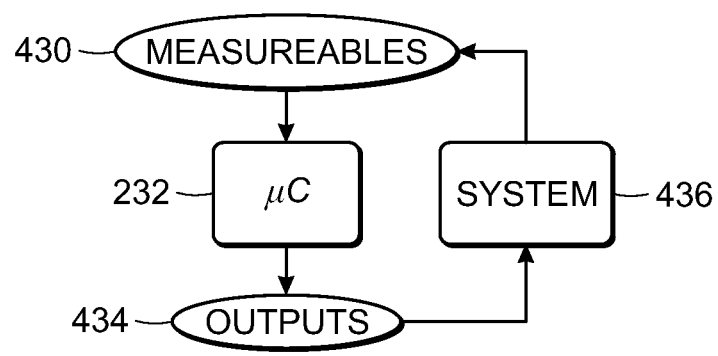
FIG. 4 is a block diagram illustrating a microcontroller that can be used to operate electrical circuits to detect, compensate, and eliminate feedthrough insulator contaminants.

When a digital command is received over a communication protocol such as RS-485 or when a digital trigger is received Periodically; for example, during a preventative maintenance cycle When there is a gauge issue such as failing to establish electron emission current When a new gauge is installed When environmental factors such as temperature, humidity, etc. are changing and are known to affect the resistance of the feedthrough insulator contamination FIG. 4 is a block diagram that further illustrates how a microcontroller 232, as described hereinabove and illustrated in FIG. 2C, can be used to operate the electrical circuits detailed above to detect, compensate, and eliminate the feedthrough insulator contaminants. An electrical system 436 includes both the sensor 202 and test and response circuit 204, which are illustrated in FIGS. 2C and 3A-3D. The system 436 provides measurable values 430 to the microcontroller 232. The measurable values can include voltages, for example, that are used to calculate leakage currents. The microcontroller 232 then performs any necessary calculations, such as those to determine leakage currents, and outputs necessary command signals to control the system 436. These command signals can include, for example, bias voltages necessary to measure or mitigate leakage currents. In some embodiments, the microcontroller is a dedicated controller with an embedded microprocessor running control software or firmware and having signal input/output capabilities. In other embodiments, the microcontroller is with a processor running control software and having an input/output card. Various firmware- or software-driven microcontrollers with the ability to sample voltages and output appropriate analog or digital control signals can be used.

All of the voltages that need to be measured (e.g., $v_{ae}$, $V_A$, $v_{C+}$, and $v_e$ in FIGS. 3B and 3C) can be done canonically using basic analog-to-digital converters (ADCs), such as those available on many different microcontrollers. In the embodiment circuit shown in FIG. 3A, there are several elements that need to be controlled, such as the anode power supply ($V_A$ in FIG. 3A), the switch that connects the anode power supply to the cathode pins ($S_I$ in FIG. 3A), and the variable resistance ($R_{cont}$ in FIG. 3A) normally used to control the cathode heating voltage.

Many standard power supply designs provide a voltage or PWM control input that corresponds to a voltage output, and this is used for the anode power supply. The control input allows for detailed operation by a microcontroller. The only major requirement for the anode power supply (outside of normal operation of a HCIG sensor) is to be able to deliver enough power to evaporate or volatilize the contaminants on both the anode and cathode feedthrough insulators in a timely manner. Evaporation or volatization requirements depend on the properties of the contaminant. In most cases, a voltage range of 10V to 3 kV and a power limit of 7 W should be more than sufficient to estimate the cathode/anode leakage currents, operate the hot-cathode sensor, and eliminate the contamination. For some users, it may be desirable to only offer the removal of the contamination as an option; this can reduce the requirements on the anode power supply. The measurement and compensation requirements may require less power than that required for contamination removal. The anode power supply hardware should preferably be tolerant of possible discharges due to arcing between sensor elements. This depends on the positioning of the sensor elements and the dielectric between the elements (e.g., nitrogen, argon, oxygen, air, etc.).

The switch $S_I$ shown in FIG. 3A can be anything ranging from a basic relay to any number of solid-state based options such as a transistor or field-effect transistor (FET), for example. The only stringent requirement is that the solution be sized to handle the voltage and current delivered by the anode power supply during contaminant removal (if removal is available). The switching does not need to occur while the anode power supply is on, and any of these solutions can be controlled by a microcontroller.

The variable resistor $R_c$ needs to have the range such that the appropriate cathode bias voltage (typically 10V to 50V) can be obtained based on the electron emission current range (typically 5 µA to 15 mA). For example, a FET with a resistance of 30Ω to 30MΩ and a source-drain limit greater than 70V should be more than sufficient.

Thus, the embodiment circuits of FIGS. 3A-3D and microcontroller apparatus of FIG. 4 enable leakage current detection and compensation or removal of contamination to be performed in situ, or while the ionization sensor remains in its environment of normal use, and while it remains under vacuum. Furthermore, in some embodiments, automated detection/compensation/removal can be performed with little or no user interaction. Further details regarding how detection/compensation/removal processes can be carried out are provided hereinafter in the description of FIGS. 5-8.

Figure 5:
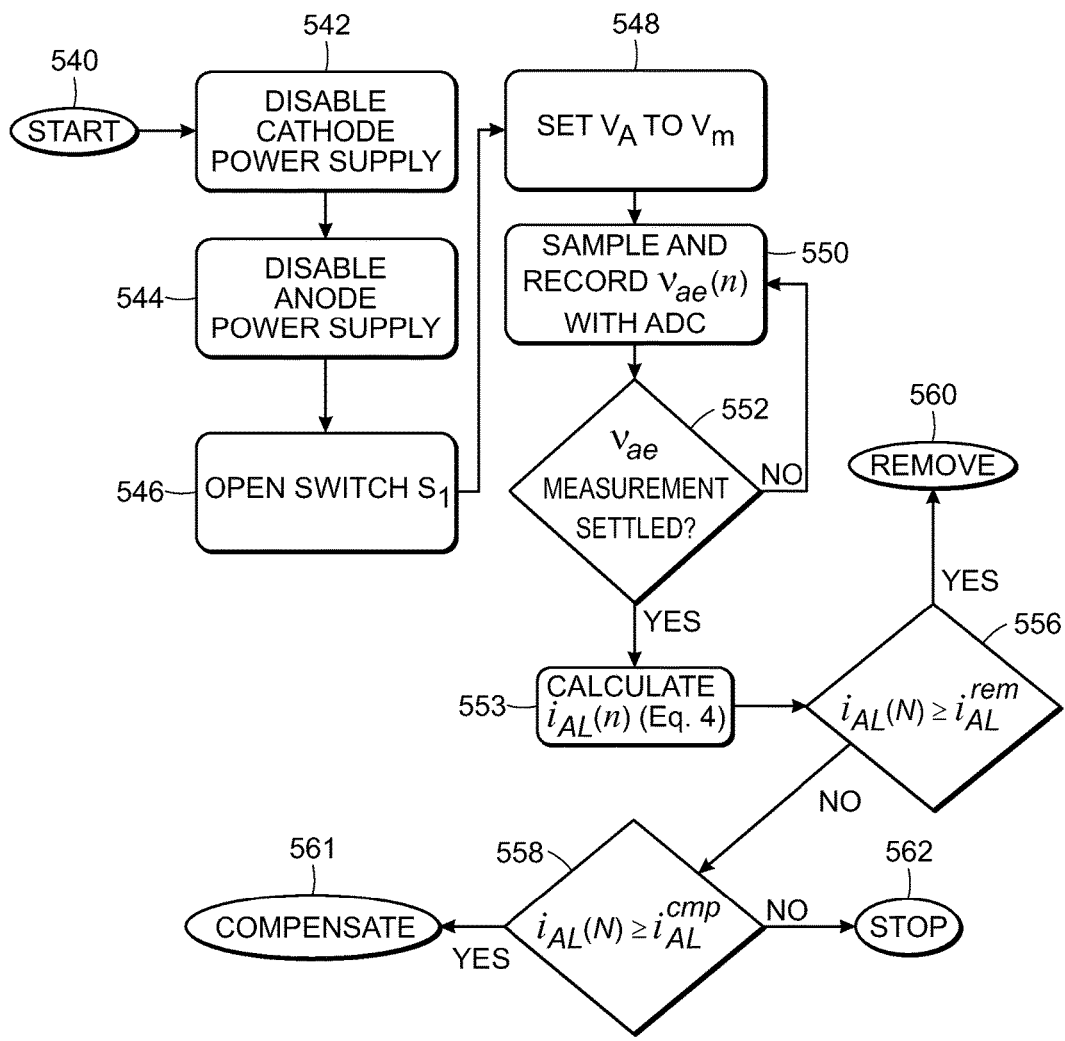
FIG. 5 is a flow diagram illustrating a method of detecting anode feedthrough insulator leakage current using the circuit illustrated in FIGS. 3A and 3B.

FIG. 5 illustrates an example process for determining the anode feedthrough leakage current ($i_{AL}$) and determining which action, if any, to take in response, given an available circuit such as the one shown in FIGS. 3A-3D. In FIG. 5, at 540, the process starts. At 542, the cathode power supply is disabled. At 544, the anode power supply is disabled. At 546, switch $S_I$ is opened. At 548, the anode power supply is set to an appropriate measuring voltage ($V_m$). At 550, the suitable measurement $v_{ae}(n)$ is continuously sampled until it has settled; this produces N samples of $v_{ae}$. Once $v_{ae}$ has settled, at 552, the process proceeds to 553 and the leakage current ($i_{AL}$) for each index is calculated according to Equation (4).

At 556 and 558, the last leakage current measurement ($i_{AL}(N)$) is compared against limits ($i_{AL}^{rem}$ and $i_{AL}^{cmp}$) to determine whether the contamination should be removed (if desired) or whether a compensation should be applied for it. If the last leakage current measurement is greater than or equal to the threshold for removal, $i_{AL}^{rem}$, then at 560, the anode contamination is removed. Further at 556, if the removal threshold is not exceeded, then at 558, the last leakage current measurement $I_{AL}(N)$ is compared to the compensation threshold $i_{AL}^{cmp}$. If the final leakage current measurement exceeds or equals the compensation threshold, then at 561, the process proceeds to compensate for the anode leakage current. However, if the compensation threshold is not exceeded, then at 562, the process stops. A lack of significant leakage current results in no action.

Figure 6:
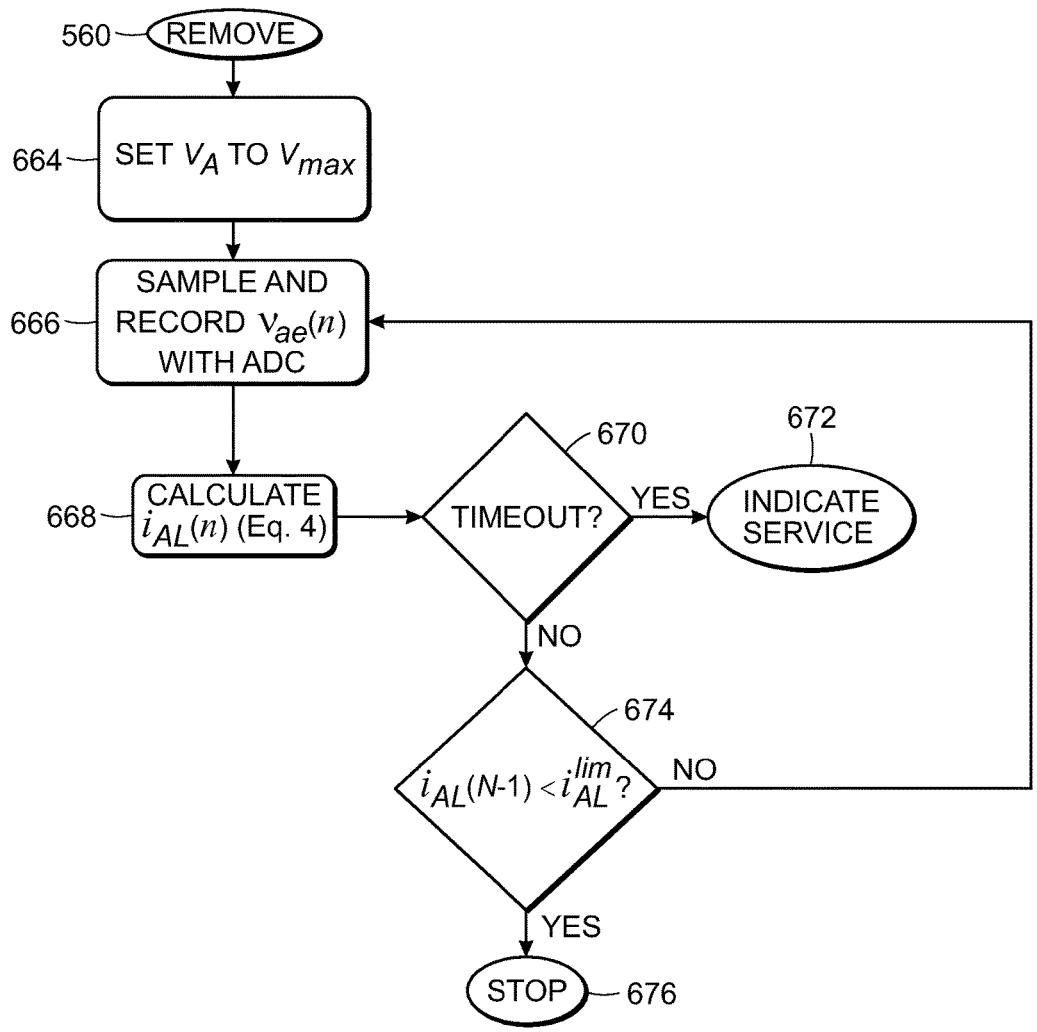
FIG. 6 is a flow diagram illustrating a detailed method of eliminating leakage current from an anode feedthrough insulator, as referenced in FIG. 5.

FIG. 6 details the removal process 560 referenced previously in the description of FIG. 5. After the removal process is triggered at 560, then at 664, the anode power supply voltage $V_A$ is set to $V_{max}$, thus increasing a voltage across the anode electrical feedthrough insulator to increase any current passing through the contamination on the insulator. The contamination is, thus, electrically heated to induce removal. At 666, the voltages $v_{ae}(n)$ are sampled and recorded with the ADC. At 668, the leakage current $i_{AL}$ is calculated according to Equation (4) until it is reduced below a certain limit or threshold $i_{A_L}^{rem}$ or until a timeout occurs. At 670, if a timeout occurs, then at 672, an indication of service is provided to the user because an acceptable reduction in electron emission current has not occurred within the timeout period. However, so long as a timeout has not occurred at 670, then at 674, the anode leakage current continues to be compared against the limit value and resampled as necessary.

Once the anode leakage current has dropped below the limit value successfully, then at 676, the process stops. A timeout at 670 can be a result of excessive contamination or arcing between sensor elements, for example. In other embodiments, if removal is not an option, then exceeding the limit $i_{AL}^{rem}$ can be used to indicate service.

Compensation of the leakage current can be done in accordance with Equation (5b). Compensation can be completed by correcting the emission control once $i_{AL}$ is known. An alternative compensation technique is to determine the "real" electron emission current using Equation (5b) and to correct the calculation of pressure according to Equation (1).

Figure 7:
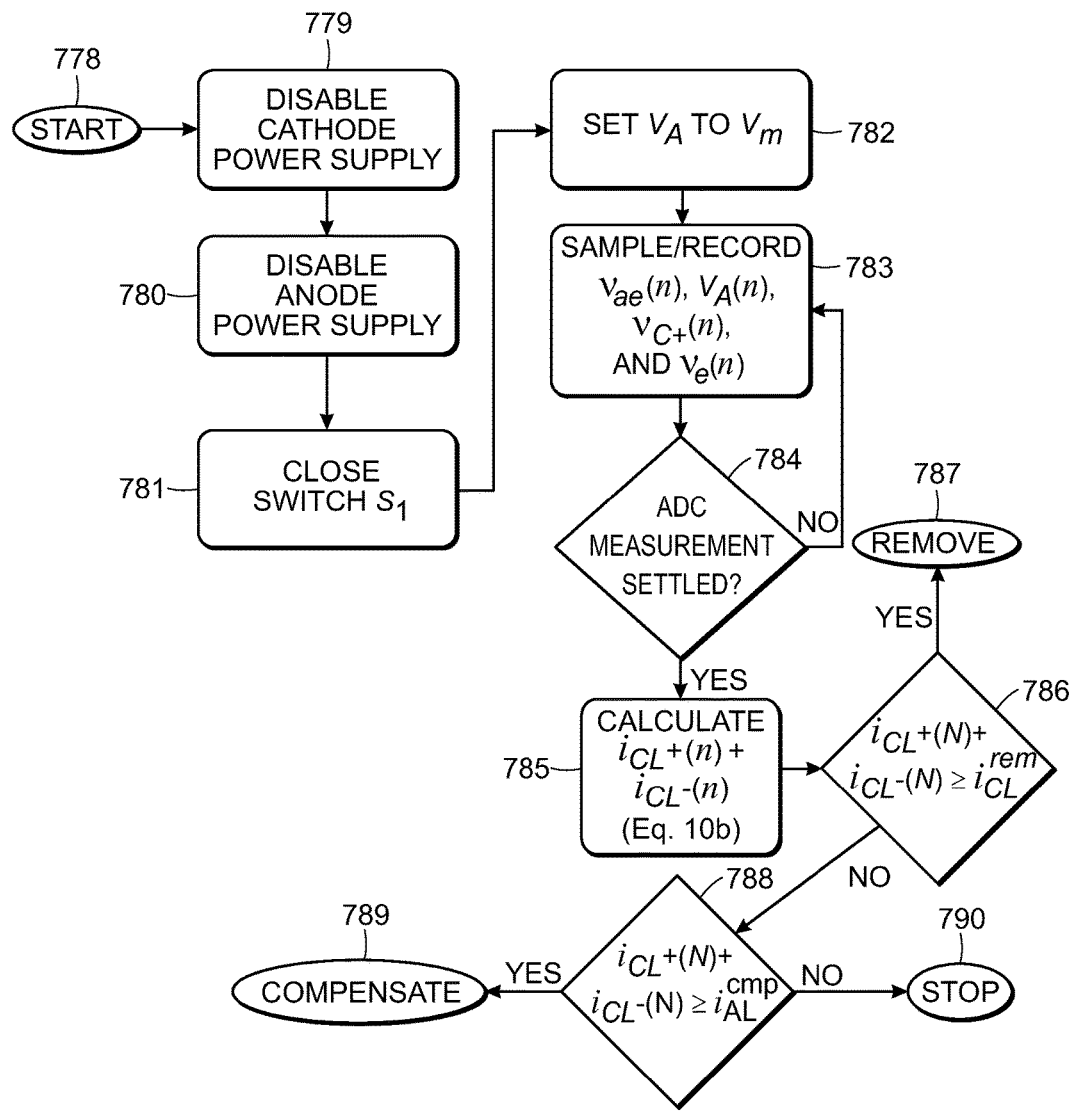
FIG. 7 is a flow diagram illustrating a method to detect cathode feedthrough insulator leakage current using the circuit illustrated in FIGS. 3A and 3C.
Figure 8:
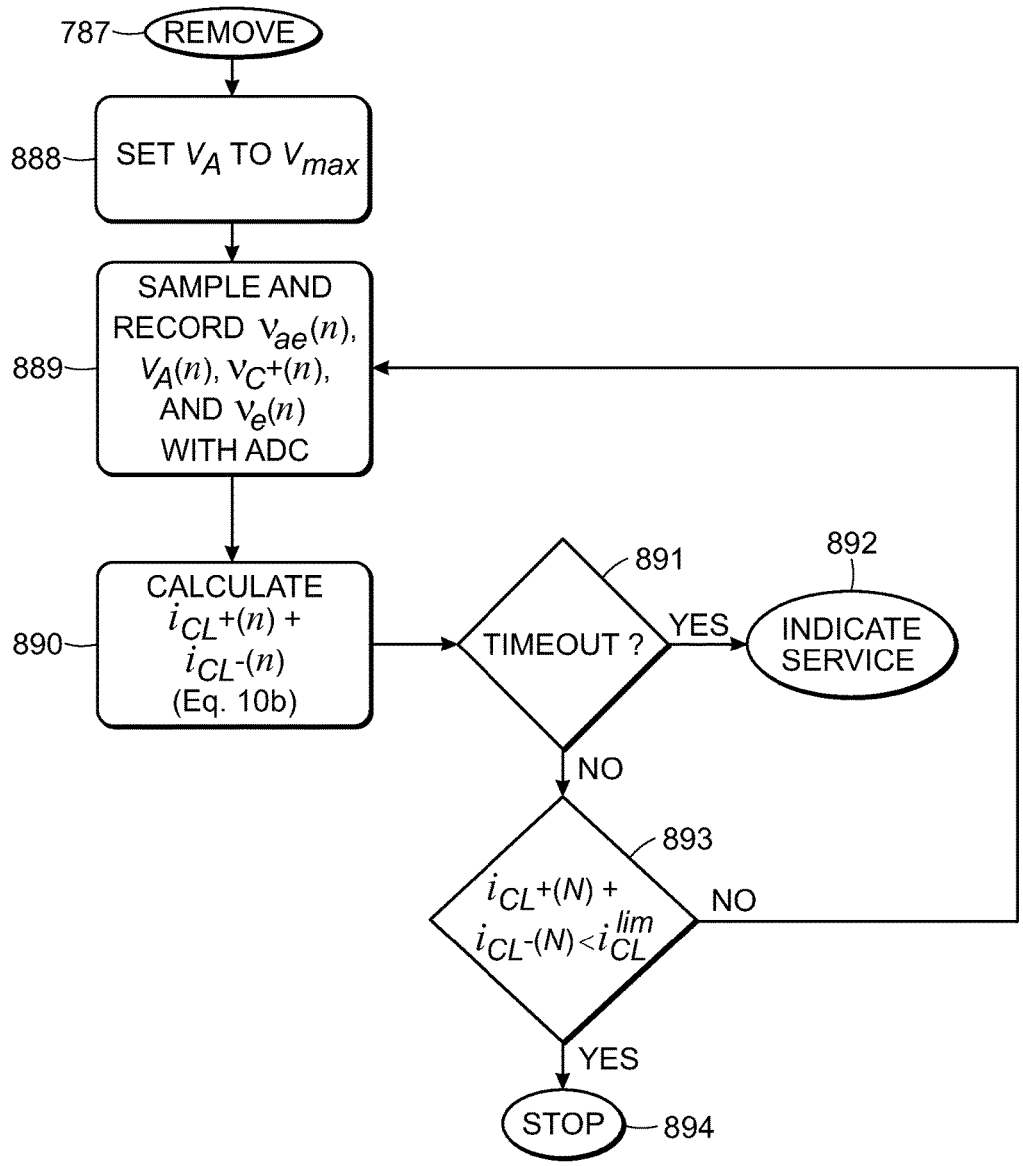
FIG. 8 is a flow diagram illustrating a detailed method to remove leakage current from a cathode feedthrough insulator as referenced in FIG. 7.

FIGS. 7-8 detail detection and measurement of leakage current across cathode feedthrough insulators and removal of contamination causing the cathode feedthrough leakage currents. In particular, in FIG. 7, the detection and measurement of leakage current across the cathode feedthrough insulators depicted is very similar to the anode leakage measurements shown in FIG. 5. The only major differences are the state of the switch $S_I$ and what is measured to calculate the leakage current.

Still referring to FIG. 7, at 778, the process starts. At 779, the cathode power supply is disabled. Then, at 780, the anode power supply is disabled. At 781, the switch $S_I$ shown in FIG. 3A is closed, as illustrated in FIGS. 3C and 3D. Then, at 782, the anode voltage $V_A$ is set to a measurement value $V_m$. At 783, the suitable measurements $v_{ae}(n)$, $V_A(n)$, $v_{C+}(n)$, and $v_e(n)$ are continuously sampled until $v_{ae}$ has settled; this produces N samples of $v_{ae}$. Once $v_{ae}$ has settled, at 784, the process proceeds to 785, and the leakage current sums $i_{CL+}(n)+i_{CL-}(n)$ for each index are calculated according to Equation (10b).

At 786 and 788, the last leakage current sum $i_{CL+}(N)+i_{CL-}(N)$ is compared against limits $i_{CL}^{rem}$ and $i_{CL}^{cmp}$ to determine whether the contamination should be removed (if desired) or whether a compensation for leakage current should be applied. If the last leakage current measurement is greater than or equal to the threshold for removal, $i_{CL}^{rem}$, then at 787, the anode contamination is removed. Further at 786, if the removal threshold is not exceeded, then at 788, the last leakage current measurement $I_{CL}(N)$ is compared to the compensation threshold $i_{CL}^{cmp}$. If the final leakage current measurement exceeds or equals the compensation threshold, then at 789, the process proceeds to compensate for the anode leakage current. However, if the compensation threshold is not exceeded, then at 790, the process stops. A lack of significant leakage current results in no action.

FIG. 8 illustrates a process for removing conductive contamination from cathode feedthrough insulators. This process is referenced at 787 in FIG. 7. The removal of contaminants shown in FIG. 8 is also similar to the anode contamination removal process described in FIG. 6. After the removal process commences at 787, at 888, the anode voltage $V_A$ is set to the maximum value $v_{maxx}$. At 889, the voltages $v_{ae}(n)$, $V_A(n)$, $v_{C+}(n)$, and $v_e(n)$ are sampled and recorded with the ADC. At 890, the leakage current $i_{CL+}(n)+i_{CL-}(n)$ is calculated according to Equation (10b) until it is reduced below a certain limit or threshold $i_{CL}^{lim}$ or until a timeout occurs. At 891, if a timeout occurs, then at 892, an indication of service is provided to the user because an acceptable reduction in electron emission current has not occurred within the timeout period. However, so long as a timeout has not occurred at 891, then at 893, the cathode leakage current continues to be compared against the limit value and resampled as necessary.

Once the cathode leakage current has dropped below the limit value successfully, then at 894, the process stops. A timeout at 891 can be a result of excessive contamination or arcing between sensor elements, for example. In other embodiments, if removal is not an option, then exceeding the limit $i_{CL}^{lim}$ can be used to indicate service.

As previously described for the case of anode leakage current, the compensation of leakage currents can take two example forms, namely correcting the emission control to create the desired electron emission current, or using the real electron emission current to correct the calculation of indicated pressure (Equation (1)). For the cathode, Equation (8a) is used to calculate the real electron emission current.

As described above, contamination of ion collector feedthrough insulators can also be an issue in some cases. Thus, in some embodiments, gauge electronics are designed to allow connection of an ion collector electrode to the anode supply during a degassing procedure, for example. Such a feature allows users to degas the collector at the same time as the anode is degassed. This connectivity can also help eliminate or reduce some of the contamination on the ion collector feedthrough insulator as well. Knowing the conductance or resistance between the ion collector feedthrough pins and ground is useful, because it allows for compensation of the ion collector current readings for the effects of ion collector electrical feedthrough insulator contamination. In these embodiments, the collector can be connected to the anode supply at any time to reduce or eliminate contamination coatings and buildup on the collector feedthrough insulators.

Further embodiments described hereinafter can provide yet other advantages, including the ability to optimize electron emission current and to eliminate dead time in pressure measurements. Dead time can be understood by referring to the example HCIG illustrated in FIG. 2A. The purpose of the cathode bias power supply 215 illustrated in FIG. 2A is to hold the cathode bias voltage $V_C$ at the bottom of the cathode 208 at a precise, constant cathode bias voltage (e.g., +30V). If the voltage $V_C$ drops below +30V, then cathode heating power is increased, which increases electron flow between the cathode 208 and anode 206 and pulls up cathode bias voltage $V_C$ at the bottom of the cathode. On the other hand, if the cathode bias voltage $V_C$ rises above +30, cathode heating power is decreased, which decreases electron flow and allows the voltage $V_C$ to drop. At a given cathode bias voltage $V_C$, the amount of electron emission current $i_e$ that will flow at the servo equilibrium can be selected by the variable resistor $R_{cont}$. The optimum electron emission current depends on gas pressure, desired cathode lifetime, measurement accuracy, etc. The variable resistor $R_{cont}$ can be controlled by a command signal from microcontroller such as the microcontroller 232 illustrated in FIGS. 2C and 4.

There are several disadvantages of HCIGs such as the one shown in FIG. 2A. One of these disadvantages is non-optimum electron emission current. Typically, the variable resistor $R_{cont}$ has only a finite number of settings, consequently limiting electron emission current to a finite number of discreet values. At any given setting, the electron emission current is still usually far from the optimum tradeoff between measurement accuracy and gauge life. It is desirable to maintain electron emission currents below 20 microamperes (µA), for example, to extend cathode lifetime. However, in the presence of leakage currents, the actual electron emission current may be unknown, and an HCIG cathode must be operated at sufficiently high electron emission current that exceeds the leakage currents and maintains pressure measurement accuracy.

A second disadvantage of the HCIG illustrated in FIG. 2A is the existence of dead time in pressure measurement. Cathode bias control implementations typically have non-zero settling time and control error, so the actual value of cathode bias voltage $V_C$ often deviates significantly from +30 V. The settling time (dead time) of the cathode bias control after a change in electron emission current setting, for example, can be up to 3 seconds, which is the industry standard settling time. This behavior is often unacceptable, as some HCIG users demand valid pressure updates every 25 ms, for example. Furthermore, a gas pressure in the HCIG can change quickly, causing both the electron emission current $i_e$ and the cathode bias voltage $V_C$ to rise or fall temporarily. During consequent dead times, measurements of pressure are likewise invalid. Thus, in traditional HCIGs, electron emission current and cathode bias voltage $V_C$ are "coupled," one affecting the other.

In one alternative existing approach to electron emission current control, the variable resistor $R_{cont}$ is replaced by a variable current source controlled by a command from a microcontroller (not shown in FIG. 2A). This alternative approach solves the problem of being limited to a small number of discrete pre-selected electron emission current choices, and the electron emission current can thus be any value. However, this alternative approach introduces a severe problem. The node at the bottom of the cathode 208 in FIG. 2A then has very high impedance to ground, resulting in cathode bias voltage $V_C$ being exceedingly sensitive to cathode power and electron emission current. The control circuitry for this alternative can require a very long time to settle and can become extremely complicated, less accurate, and potentially unstable. Thus, the advantage of having an adjustable current source comes with significant tradeoffs in circuit stability and reliability.

In accordance with embodiments described hereinafter, problems associated with coupling and dependency between the electron emission current and cathode bias voltage can be overcome. A transistor circuit can be used to control electron emission current and cathode bias voltage independently. Such a transistor circuit can pass electron emission current with very low or substantially zero input impedance while controlling cathode bias voltage independent of electron emission current. The cathode bias power supply 215, with its accompanying settling time, can be eliminated to provide pressure measurements that are continuously valid regardless of gas pressure or electron emission current.

Figure 9A:
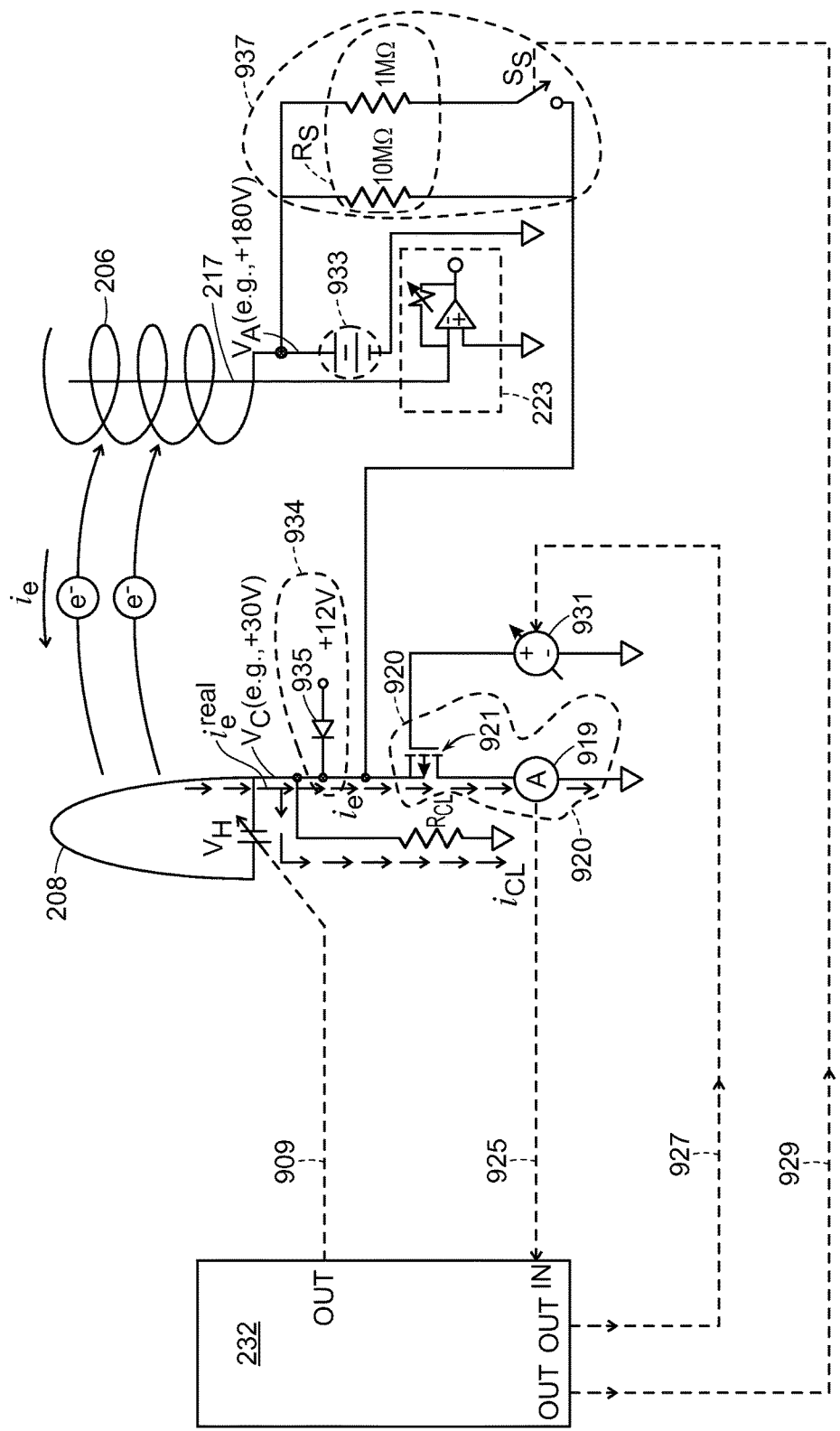
FIG. 9A is a schematic diagram illustrating an HCIG coupled to a transistor circuit for electron emission current control and to a leakage test calibration current source.

FIG. 9A is a schematic diagram illustrating an HCIG circuit including a transistor circuit 920 in which the direct bias with a FET 921. A variable voltage source 931 has a cathode bias voltage control input to receive a gate control signal 927 from the microcontroller 232. The variable voltage source 931 is thus controlled by the microcontroller 232 to control bias voltage of the transistor 921 gate (control terminal). While the variable voltage source 931 is used in the embodiment of FIG. 9A, a direct input from the microcontroller or a fixed voltage source can be used in other embodiments. The FET has an offset voltage between a source reference terminal and the gate control terminal that is not sensitive to electron emission current. Thus, the cathode bias voltage $V_C$ can be precisely set by the gate voltage plus offset. Also, the electron emission current sees a substantially zero input impedance, effectively eliminating the cathode bias voltage control settling time described above. The HCIG circuit of FIG. 9A also includes a current sensor 919 that is configured to measure electron emission current. Measuring gauge pressure using the embodiment of FIG. 9A thus includes measuring electron emission current using the current sensor 919, and pressure P can then be obtained by using Equation (1) above.

The variable voltage source 931, in combination with an offset circuit 934 including a diode 935 to +12 V, allows precise calibration of an offset voltage $V_{GS}$ associated with the FET 921. Specifically, the cathode bias voltage $V_C$ of the cathode 208 is equal to a voltage applied to a gate of the FET (via the power source 931) plus an offset voltage of the FET 921. The diode 935 is electrically connected to the transistor circuit to facilitate detection of the offset of the FET transistor 921. The diode voltage drop is well defined. With zero cathode heating power and zero actual electron emission current, the gate voltage to FET 921 can be gradually decreased until current is sensed at the current sensor 919. At that point, the FET source gate offset is the difference between (+12.0 V minus the diode voltage) and the gate voltage 931. The offset voltage is relatively constant over a wide range of source (emission) currents. This allows the voltage at the bottom of the cathode to be set very accurately to +30 V, for example, even though there is no direct measurement of the +30 V node. Avoiding any direct measurement of the +30 V node is a useful feature of this embodiment, because any direct measurement of the node's voltage will drain some non-zero current, which can result in an electron emission current measurement error. In the embodiment of FIG. 9A, the diode 935 is the only component of the offset circuit 934 that detects the transistor 921 offset. However, in other embodiments, an alternative offset circuit can include any number of components that, separately or in combination with each other, are configured to detect the offset of the transistor 921.

Even without the diode 935, pressure measurements using the HCIG illustrated in FIG. 9A may have accuracy within about 5%, for example. However, with the benefits of calibrating the FET offset voltage using the diode 935, theoretical pressure measurement accuracy is within about 1%, for example. It should be noted that, while the diode approach to calibrating the FET offset is very compact and economical, alternative approaches to calibration can also be used. Also, although less preferred, the actual cathode bias voltage may be measured, instead of setting the FET gate voltage to the desired cathode bias voltage minus the FET offset voltage. This alternative approach also allows the cathode bias voltage to be very accurate without calibration of FET. However, in this alternative approach, electron emission current accuracy can be decreased somewhat due to some electron emission current flowing into the cathode bias voltage measurement circuit.

The microcontroller 232 monitors current flowing through the current sensor 919 via an electrical input 925 that is electrically connected and output from the current sensor 919. Specifically, an electron emission current monitor input 925 is used by the microcontroller 232 to read the current sensor 919.

Leakage currents described hereinabove can also be mitigated using the embodiment of FIG. 9A. As contamination that causes leakage currents increases, a pressure gauge can ultimately fail (e.g., by cathode degradation). Leakage currents can also cause inaccuracies if ignored. Leakage currents generally limit the minimum practical electron emission currents that can be used in HCIGs, limiting the upper pressure at which HCIGs can be operated. Leakage currents can also limit the lower pressure at which HCIGs can be operated due to the need to measure very low ion currents at these pressures. FIG. 9A illustrates one such leakage current path, which redirects some current from the electron emission current path. This current is represented by $i_{CL}$, flowing through a resistance $R_{CL}$ that arises from the feedthrough insulator contamination (shown as $R_{CL}$). Using the procedure described hereinafter in conjunction with FIG. 9B, the effects of the leakage current $i_{CL}$ can be canceled out such that the microcontroller 232 can obtain an indication of the real electron emission current $i_e^{real}$. The procedure described hereinafter in conjunction with FIG. 9B makes use of an additional current supply, a leakage test current source 937, that connects to the electron emission current path as shown in FIG. 9A. The embodiment of FIG. 9A makes use of the anode power supply 933 as a convenient source of a calibration current $i_{cal}$ that can be used for calibration with respect to leakage current as described hereinafter. In other embodiments, current may be provided by a separate power supply, such as a transistor current source, or by a different power supply already present in the system.

In FIG. 9A, two resistors, a 1 MΩ resistor and a 10 MΩ resistor, are electrically connected to the anode power supply 933 in parallel, forming the leakage test current source 937. Thus, the leakage test current source 937 includes a resistance coupled to the anode bias supply. In turn, the MOSFET transistor 921 is electrically connected to the leakage test current source 937 to enable current flow through the transistor 921 even with the electron emission current set to zero. Current is allowed to flow through either the 10 MΩ resistor alone, or the 10 MΩ and 1 MΩ resistors in parallel, to the electron emission current path, depending upon the position of a leakage current range selection switch $S_s$, which is controlled by the microcontroller 232 via an electrically connected leakage current range selector signal 929. The switch $S_s$ is configured to switch a current range of the leakage test current source 937 in accordance with the level of leakage current $i_{CL}$, as further described hereinafter. The switch $S_s$ allows more accurate cancellation of leakage currents over a wider range of leakage resistance. However, in other embodiments, moderately accurate cancellation over a moderate range of leakage resistance $R_{CL}$ can be performed with the 10 MΩ resistor or a different resistor alone. Use of the leakage test current source 937 is described below with respect to FIG. 9B.

For the embodiment of FIG. 9A, therefore, the microcontroller 232, transistor circuit 920 with current sensor 919, anode power supply 933, and leakage test current source 937 form an electrical circuit coupled to the ionization gauge (cathode 208, anode 206, and collector 217) and configured to test the ionization gauge under vacuum in situ for leakage current and to respond to the leakage current to improve pressure measurement accuracy. One procedure that can be used to test for and respond to leakage current is illustrated in FIG. 9B.

Figure 9B:
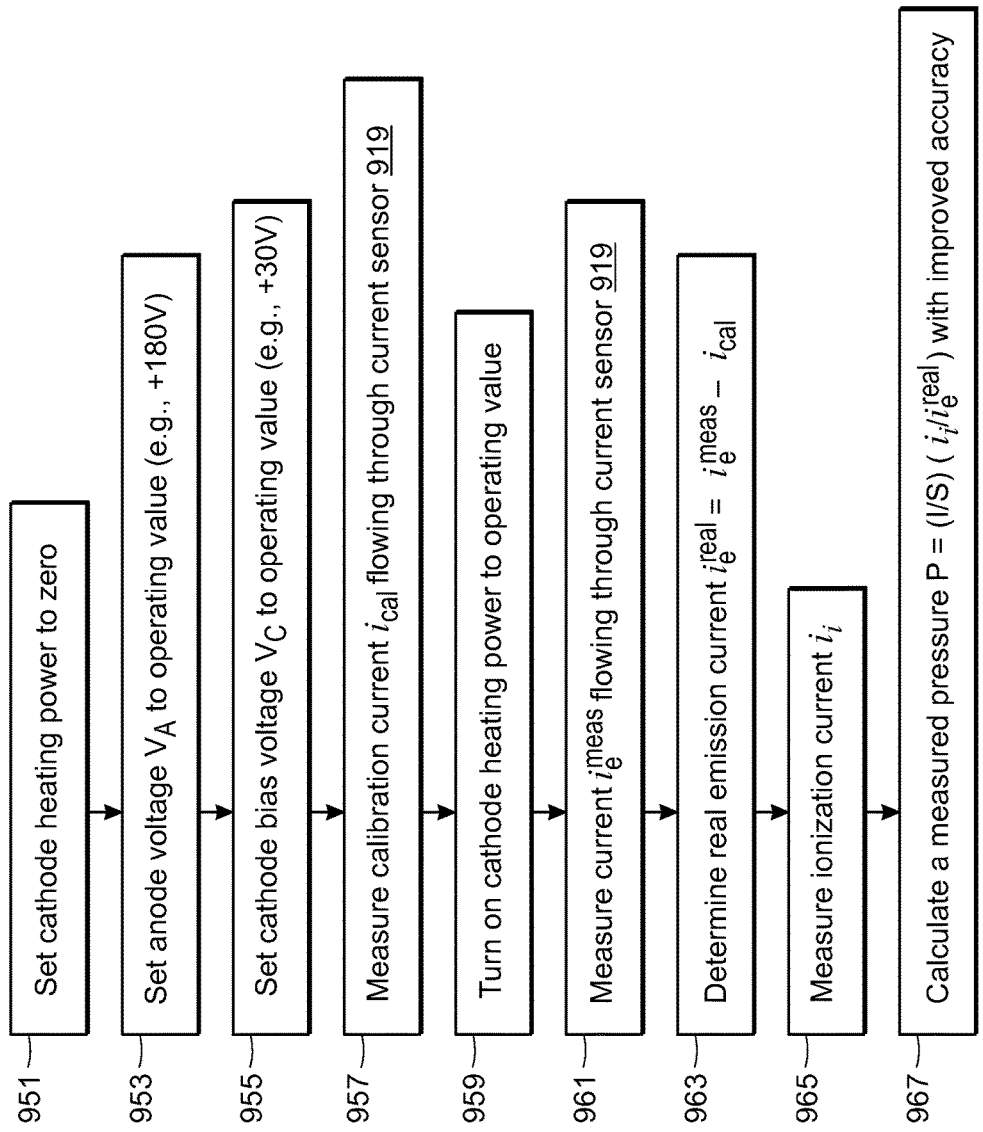
FIG. 9B is a flow diagram illustrating a method of testing and responding to leakage current using the HCIG and transistor circuit of FIG. 9A.

FIG. 9B is a flow diagram illustrating an example procedure that can be used to measure and cancel the effects of leakage current in the HCIG illustrated in FIG. 9A. At 951, the cathode heating power is set to zero via the cathode heating power control 909. Under this condition, no emission can occur from the cathode 208. At 953, the anode voltage $V_A$ is set to the normal operating value (e.g., +180 V). At 955, the cathode bias voltage $V_C$ is set to the normal operating value (e.g., +30 V) by sending the appropriate gate control signal 927 from the microcontroller 232 to the variable voltage source 931. At 957, the calibration current $i_{cal}$ flowing through the current sensor 919 is measured and recorded by the microcontroller 232. Thus, the current sensor 919 in FIG. 9A is configured to test for leakage current by measuring the calibration current $i_{cal}$, which reflects leakage current. This function of the current sensor is in addition to the function of measuring electron emission current.

Note that the equivalent resistance between the anode and FET source is $R_s$, as indicated in FIG. 9A. In the case in which the switch $S_S$ is open, $R_s$=10 MΩ. In this case, all the current $i_{cal}$ measured at the current sensor passes through the 10 MΩ resistor of the current source 937. Some fraction of the current from the 10 MΩ resistor flows through the leakage resistor $R_{CL}$, while the remainder flows down through the MOSFET 921 and current sensor 919. It is not necessary to know the fractional currents flowing through these two resistor paths with this calibration method. The leakage current can be calculated as the difference between current through $R_s$ and that sensed as $i_{cal}$, or $i_{CL}=[(V_A-V_C)/R_S]-i_{cal}$, and the leakage resistance can be calculated by $R_{CL}=V_C/i_{CL}$.

Continuing to refer to FIG. 9B, at 959, the cathode heating power supply $V_H$ is turned on to its normal operating value. Emission from the cathode 208 then occurs, and normal operation of the HCIG begins. At 961, a current $i_e^{meas}$ flowing through the current sensor 919 is measured and recorded by the microcontroller 232. Because the cathode bias voltage $V_C$ is the same as when the calibration current $i_{cal}$ was measured, the current through the leakage path remains $i_{CL}$=30 V/$R_{CL}$. Any actual electron emission current will flow entirely down through the FET 921 and current sensor 919 for the measurement of $i_e^{meas}$. At 963, the microcontroller 232 determines a real electron emission current $i_e^{real}=i_e^{meas}-i_{cal}$ because $i_{cal}$ contains flow through $R_S$. Thus, the microcontroller 232 calculates a difference between electron emission current measured with the cathode heated and electron emission current measured with a cathode unheated, and the difference is thus used for calibration of the ionization pressure gauge with respect to a leakage current, namely removing the effects of leakage current $i_{CL}$ from measurements of electron emission current $i_e$. Thus, the microprocessor 232 computes pressure based on both the calibration current $i_{cal}$ and on the measured emission current $i_e^{meas}$. The real electron emission current $i_e^{real}$ thus has the effect of leakage current removed.

Furthermore, pressure measured by the ionization pressure gauge can be calculated and reported with improved accuracy, because the measured pressure can also have the effect of leakage current removed. As further illustrated in FIG. 9B, at 965, the ionization current $i_i$ is measured. At 967, a pressure is calculated by the microcontroller 232 according to Equation (1) for pressure P described hereinabove, except that the real electron emission current $i_e^{real}$ is used as follows: $P=(1/S)(i_r/i_e^{real})$. Thus, using the embodiment apparatus and method of FIGS. 9A-9B, respectively, for example, the HCIG can be tested for the effects of leakage current. This can be done even with the gauge under vacuum, in situ in its normal environment of use. The leakage current is tested for by measuring $i_{cal}$, which reflects the leakage current. The leakage current can then be responded to, for example, by subtracting out its effects within the microcontroller 232 as described hereinabove, thus increasing pressure measurement accuracy.

Preferably, the total current through the 10 MΩ resistor or both of the resistors in parallel is slightly greater than the leakage current $i_{CL}$. In that case, $i_{cal}$ is close to zero, and a $i_e^{meas} \gg i_{cal}$, and smaller errors will accumulate in the subtraction operation. The switch $S_s$ allows one of two different leakage cancellation currents to be selected. $S_s$ will typically be open, but it can be closed, for example, when the leakage current $i_{CL}$ exceeds $V_C/10$ MΩ. Thus, the switch $S_S$ is configured to switch the current range of the leakage test current source in accordance with a level of leakage current.

It should be understood that an exact leakage current cancellation can be performed in many other ways using circuits similar to the circuit in FIG. 9A, with various modifications. For example, a variable and programmable leakage current source can be used in place of the current leakage test source 937. Such a programmable leakage current source can be adjusted, for example, until it reaches a minimal resolvable current level greater than zero, measured at the current sensor. In this case, current measurements at the current sensor 919 will be the actual electron emission current. Also, in some embodiments, the cathode heating power need not be turned off during a measurement of $i_{cal}$. For example, the anode voltage $V_A$ can be temporarily disconnected from the anode 206, while remaining connected to the test current supply 937, by means of an additional switch (not shown). This will cause electron emission current to be zero, without a need to cool the cathode. These embodiments have the advantage that measurements of $i_{cal}$ can be performed very quickly, with less interruption of the operation of the HCIG. Furthermore, while the apparatus in FIG. 9A illustrates the leakage resistor $R_{CL}$ corresponding to contamination of only one electrical feedthrough, other embodiments include corresponding circuitry to mitigate leakage current corresponding to multiple feedthroughs. The method illustrated in FIG. 9B can also be modified accordingly.

Thus, advantages provided by embodiments of the current invention include the ability to operate at lower electron emission currents, the ability to accurately control electron emission current and provide accurate pressure measurements, and the ability to accurately control electron emission currents and provide longer gauge lifetime. Sputtering produced by ions in HCIGs is reduced, and the temperature of operation of the cathode is also diminished, leading to reduced chemical reactivity with thermally labile compounds. Some example applications that can benefit from embodiment devices and methods include semiconductor processes operating above one millitorr (mTorr) and ion implant operations where both sputtering and chemical reactivity can be problematic. Using the embodiment devices and methods described above, vacuum pressures can be measured with an accuracy within a range of about ±15%, even when HCIGs are operated with an electron emission current in a range of about 5-10 µA.

It should also be pointed out that while primarily HCIGs have been focused on in this disclosure, methods similar to those described herein can also be applied to cold cathode ionization gauges and a variety of types of HCIG configurations, some of which are listed hereinabove. Furthermore, those skilled in the art will recognize that there are various other ways to measure and compensate for leakage current, as well as to remove feedthrough insulator contamination, that are within the scope of the current invention.

In addition to the HCIG control circuit illustrated in FIG. 9A, there are many alternative transistor-based circuits that can likewise control electron emission current in an HCIG with low input impedance. Various alternative transistor-based control circuits are described in the U.S. patent application Ser. No. 14/795,729 entitled "Ionization Pressure Gauge With Bias Voltage and Emission Current Control and Measurement," which is being filed on even date herewith, and which lists inventor Douglas C. Hansen. The teachings of the aforementioned Application and any other patents, published applications, and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A device comprising:
an ionization gauge in which ions are generated by electron flow between a cathode and an anode; and
an electrical circuit coupled to the ionization gauge and configured to test the ionization gauge under vacuum in situ for leakage current and to respond to the leakage current to improve pressure measurement accuracy by applying a correction for the leakage current in an electron emission current control feedback loop that is configured to control the electron flow between the cathode and the anode.

2. The device of claim 1, wherein the electrical circuit is further configured to decontaminate the ionization gauge in situ by electrically heating contamination in the ionization gauge.

3. The device of claim 2, wherein the electrical circuit is further configured to decontaminate the ionization gauge with the ionization gauge under vacuum.

4. The device of claim 2, wherein the contamination is on an electrical insulator configured to electrically isolate an electrical feedthrough conductor in the ionization gauge, and wherein the electrical circuit is further configured to electrically heat the contamination by increasing a voltage across the electrical feedthrough insulator to increase any current passing through the contamination on the insulator.

5. The device of claim 1, wherein the tested leakage current is from at least a cathode feedthrough conductor.

6. The device of claim 1, wherein the tested leakage current is from at least an anode feedthrough conductor.

7. The device of claim 1, wherein the electrical circuit is further configured to respond to the tested leakage current by applying a correction to a pressure measurement signal generated by the device based on the leakage current.

8. The device of claim 1, wherein the electrical circuit includes a current sensor configured to measure a calibration current that reflects leakage current and to measure electron emission current and a processor to compute pressure based on the calibration current and the measured electron emission current.

9. The device of claim 1, wherein the electrical circuit is configured to test for the leakage current by increasing voltage applied across an electrical feedthrough insulator and measuring current through the contamination on the insulator.

10. The device of claim 1, wherein the ionization gauge is a hot cathode ionization gauge.

11. The device of claim 1, further including an indicator configured to provide, based on a level of the tested leakage current, an indication that the ionization gauge requires service or replacement.

12. The device of claim 1, wherein the measured vacuum pressure has an accuracy within a range of about ±15% when the ionization gauge is operated with an electron emission current in a range of about 5-10 microamperes.

13. A method comprising:
measuring vacuum pressure in an ionization gauge by measuring ions generated with electron flow between a cathode and an anode;
testing the ionization gauge under vacuum in situ for leakage current; and
responding to the leakage current to improve pressure measurement accuracy by applying a correction for the leakage current in an electron emission current control feedback loop that is configured to control the electron flow between the cathode and the anode.

14. The method of claim 13, wherein pressure measurement accuracy is further improved by decontaminating the ionization gauge in situ by electrically heating contamination in the ionization gauge.

15. The method of claim 14, wherein decontaminating the ionization gauge is performed with the ionization gauge under vacuum.

16. The method of claim 14, wherein the contamination is on an electrical feedthrough insulator configured to electrically isolate an electrical feedthrough conductor in the ionization gauge, and wherein electrically heating the contamination comprises increasing a voltage across the electrical feedthrough insulator to increase any current passing through the contamination on the insulator.

17. The method of claim 13, wherein the tested leakage current is from at least a cathode feedthrough conductor.

18. The method of claim 13, wherein the tested leakage current is from at least an anode feedthrough conductor.

19. The method of claim 13, wherein responding to the leakage current further comprises applying a correction to the pressure measurement based on the tested leakage current.

20. The method of claim 13, wherein measuring vacuum pressure includes measuring electron emission current using a current sensor, testing for leakage current includes measuring, using the current sensor, a calibration current, and responding to the leakage current includes calculating pressure based on measured electron emission current and the calibration current.

21. The method of claim 13, wherein testing for leakage current comprises increasing voltage applied across an electrical feedthrough insulator and measuring current through the contamination on the insulator.

22. The method of claim 13, wherein the ionization gauge is a hot cathode ionization gauge.

23. The method of claim 13, further comprising providing, based on a level of the leakage current, an indication that the ionization gauge requires service or replacement.

24. The method of claim 13, wherein the measured vacuum pressure has an accuracy within a range of about ±15% when the ionization gauge is operated with an electron emission current in a range of about 5-10 microamperes.

* * * * *